United States Patent
Michel

(10) Patent No.: US 12,537,676 B2
(45) Date of Patent: Jan. 27, 2026

(54) METHODS AND SYSTEMS FOR THE IMPLEMENTATION OF NTRU-LIKE CRYPTOSYSTEM RELYING ON OPTICAL FOURIER TRANSFORMS

(71) Applicant: Optalysys Limited, Leeds (GB)

(72) Inventor: Florent Christian Lucien Marie Michel, Castleford (GB)

(73) Assignee: Optalysys Limited, Leeds (GB)

( * ) Notice: Subject to any disclaimer, the term of this patent is extended or adjusted under 35 U.S.C. 154(b) by 158 days.

(21) Appl. No.: 18/006,503

(22) PCT Filed: Jul. 22, 2021

(86) PCT No.: PCT/GB2021/051897
§ 371 (c)(1),
(2) Date: Jan. 23, 2023

(87) PCT Pub. No.: WO2022/018448
PCT Pub. Date: Jan. 27, 2022

(65) Prior Publication Data
US 2023/0291552 A1    Sep. 14, 2023

(30) Foreign Application Priority Data
Jul. 23, 2020  (GB) .................................... 2011415

(51) Int. Cl.
*H04L 9/08*   (2006.01)
*G06F 17/14*  (2006.01)

(52) U.S. Cl.
CPC ............ *H04L 9/0861* (2013.01); *G06F 17/14* (2013.01); *H04L 9/0825* (2013.01)

(58) Field of Classification Search
CPC ................. H04L 9/0861; H04L 9/0825; H04L 2209/122; H04L 2209/125; H04L 9/3093; G06F 17/14
See application file for complete search history.

(56) References Cited

U.S. PATENT DOCUMENTS

| | | | |
|---|---|---|---|
| 2002/0041681 A1* | 4/2002 | Hoffstein | H04L 9/3066 380/28 |
| 2002/0136401 A1* | 9/2002 | Hoffstein | H04L 9/3218 380/28 |

(Continued)

FOREIGN PATENT DOCUMENTS

| | | | |
|---|---|---|---|
| EP | 0920753 B1 * | 12/2006 | ........... H04L 9/3093 |
| GB | 2612928 A  * | 5/2023  | ........... H04L 9/3093 |
| WO | 2019207317 A1 | 10/2019 | |

OTHER PUBLICATIONS

Bagheri et al., "A non-commutative cryptosystem based on quaternion algebras", pp. 2345-2377, 2017 (Year: 2017).*

(Continued)

*Primary Examiner* — John B King
(74) *Attorney, Agent, or Firm* — Potomac Law Group, PLLC; Reza Mollaaghababa

(57) ABSTRACT

A crypto-method of securely communicating a message; the method comprises the steps of selecting a ring R' of bi or multi variate multinomials; generating a private key which has a multinomial f; generating a public key which has a multinomial h; encrypting by representing said message as a multinomial m in R', selecting a random multinomial r, and computing an encrypted message; and decrypting said message using said private key.

17 Claims, 6 Drawing Sheets

(56) References Cited

U.S. PATENT DOCUMENTS

| | | | | |
|---|---|---|---|---|
| 2004/0151309 | A1* | 8/2004 | Gentry | H04L 9/3093 713/176 |
| 2018/0165797 | A1* | 6/2018 | Yurlov | G06T 5/70 |
| 2022/0385479 | A1* | 12/2022 | Hoffstein | H04L 9/3093 |

OTHER PUBLICATIONS

Dai et al., "Optimizing polynomial convolution for NTRUEncrypt", 2018 (Year: 2018).*

International Preliminary Report on Patentability for International Application No. PCT/GB2021/051897 dated Jan. 24, 2023.

International Search Report for International Application No. PCT/GB2021/051897 mailed on Dec. 20, 2021.

Written Opinion for International Application No. PCT/GB2021/051897 mailed Jan. 27, 2022.

Öztürk, E. et al., "A Custom Accelerator for Homomorphic Encryption Applications", IEEE Transactions on Computers, vol. 66, No. 1, Jan. 1, 2017, pp. 3-16.

\* cited by examiner

METHODS AND SYSTEMS FOR THE IMPLEMENTATION OF NTRU-LIKE CRYPTOSYSTEM RELYING ON OPTICAL FOURIER TRANSFORMS

TECHNICAL FIELD

The invention generally relates to systems for public-key cryptography. More particularly, the invention relates to secure information exchange suitable for implementation on optical devices. The invention has particular applications which are quantum secure (that is, would not be easy to break by a quantum computer) and which thus have long term security as required by banking applications for example.

BACKGROUND AND PRIOR ART KNOWN TO THE APPLICANT(S)

Currently there are two main types of cryptosystems used to securely exchange information over an untrusted channel: private-key, which is generally fast, but requires that keys have already been securely exchanged, and public-key which is generally slower, but has no such requirement. For example, a public-key cryptosystem may be used to securely exchange keys to be used in a private-key cryptosystem.

Some of the most-common public-key cryptosystems, such as RSA and elliptic-curve algorithms, are based on arithmetic problems which would be easy to break by a quantum computer, resulting in lack of future-proofness.

The NTRU family of cryptosystems to which NTRUEncrypt belongs is one of the main proposals for post-quantum public-key cryptography, combining strong security arguments, resistance to known quantum attacks, and small key size. NTRU are lattice-based cryptosystems, expected to be quantum-secure, the NTRU being 2nd-round candidate for the NIST post-quantum standardization process. The main operations in NTRU involve polynomial multiplication. U.S. Pat. No. 6,081,597A is a disclosure of the prior art cryptosystems.

The following prior art is acknowledged: Bagheri Khadijeh et al entitled "A non-commutative cryptosystem based on quaternion algebras", Designs, Codes and Cryptography, Kluwer Academic Publishers, vol. 86, no. 10, 22 Dec. 2017 (2017 Dec. 22), pages 2345-2377, XP036577232, DOI: 10.1007/S10623-017-0451-4.

This prior art reference requires the use of quaternion algebra over a ring of multinomials. By contrast, embodiments of the invention depart from this teaching as further described in the following section.

Embodiments of the invention seek to improve on the existing prior art methodologies.

SUMMARY OF THE INVENTION

In a broad independent aspect, an embodiment of the invention provides a crypto-method of securely communicating a message; the method comprising the steps of:
  selecting a ring R' of bi or multi variate multinomials;
  (A multinomial over a ring R' is a sum of a finite number of terms consisting in an element of R' times powers of several variables.)
  generating a private key which has a multinomial f;
  generating a public key which has a multinomial h;
  encrypting by representing said message as a multinomial m in R', selecting a random multinomial r, and computing an encrypted message; and
  decrypting said message using said public key.

In preferred embodiments, the crypto-method employs a multinomial ring which employs multinomial algebra over that ring. This difference over the most recently cited prior art is not only formal but very significant in the context of an optical implementation which provides an efficient way to perform multinomial inversion. By contrast the prior art works with a specific ideal. Embodiments of the invention allow for efficient multinomial inversion in any ideal making it more versatile than the prior art methodology. This is further advantageous in embodiments of optical implementation where the choice of ideal will be partially constrained by the optical device input size and output accuracy.

In a subsidiary aspect, the steps comprise multiplications which are performed in a ring of multinomials.

In a further subsidiary aspect, the steps comprise multiplications which are performed in the canonical algebra over R'.

In a further subsidiary aspect, the method further comprises the step of casting said message as a two-dimensional array.

In a further subsidiary aspect, the ring R' is chosen as the quotient of Z[X,Y] over the ideal generated by two univariate polynomials.

In a further subsidiary aspect, the steps comprise multiplications which are performed modulo two polynomials.

In a further subsidiary aspect, the method further comprises the step of providing an optical processing system and thereby performing a two-dimensional discrete Fourier transform.

In a further subsidiary aspect, the ring R' of multinomials is represented by the formula $Z[X,Y]/<X^{N_1}, Y^{N_2}-1>$, where $(N_1, N_2) \in \mathbb{N}^{*2}$, wherein $N_1$ and $N_2$ are prime numbers.

In a further subsidiary aspect, the crypto-method further comprises the step of providing a message digest m in the form of a multinomial.

In a further subsidiary aspect, the crypto-method further comprises the steps of providing 2D optical arrays and wherein the multinomial m represents a discrete 2D array.

In a further subsidiary aspect, the crypto-method further comprises the steps of providing an optical system suitable for performing both a Fourier transform and an inverse Fourier transform and optically realising both said Fourier transform and said inverse Fourier transform.

In a further subsidiary aspect, the crypto-method comprises the steps of performing a multinomial multiplication and reducing coefficients of a product of multinomials.

In a further subsidiary aspect, the method further comprises the step of reducing the amplitude of individual coefficients of the multinomials.

In a further subsidiary aspect, the method further comprises the step of iteratively reducing coefficients of a product of multinomials by writing each factor as a sum of multinomials with smaller coefficients.

In a further subsidiary aspect, the crypto-method further comprises the step of reducing coefficients by reducing degrees of the multinomials to be multiplied.

In a further subsidiary aspect, the method further comprises the step of reducing the coefficients of a product of multinomials by writing each factor as a sum of multinomials with smaller degrees.

In a further subsidiary aspect, the security of the cryptosystem is established by reduction to a short vector problem using tensors.

In a further broad aspect, the system comprises a processor configured to perform the steps of:
- selecting a ring R' of bi or multi variate multinomials;
- generating a private key which has a multinomial f;
- generating a public key which has a multinomial h;
- encrypting by representing said message as a multinomial m in R' selecting a random multinomial r, and computing an encrypted message; and
- decrypting said message using said private key.

In a further broad aspect, the system comprises an optical processor configured to perform Fourier transform processing to carry out a multinomial multiplication in the ring R of multinomials.

In a further broad aspect, the system comprises an optical processor configured to perform Fourier transform processing to carry out a multinomial multiplication in the canonical algebra of a ring R' of two or more variate multinomials.

In a further broad aspect, the method for encrypting and decrypting a digital message, the method comprises the steps of:
- selecting a ring R, an ideal q of R, and a hash function;
- (An ideal is a subset of a ring which has a group structure and is stable under multiplication by any element of the ring.)
- generating elements f and g of the ring R, and generating an element $f^{-1}$ that is an inverse of f in the ring R modulo q;
- producing a public key that includes h where h is equal to a product that can be derived using g and $f^{-1}$;
- producing a private key from which f and g can be derived;
- producing a message digest m by applying the hash function to the digital message;
- encrypting the message using the public key;
- decrypting the message using the private key
- wherein in the step of producing the encrypted message, a multiplication is computed in the ring R using Fourier transform processing implemented optically.

In a subsidiary aspect, the steps are performed after reducing the magnitude of the multinomials as in the method of any one of the preceding aspects.

In a further subsidiary aspect, the system comprises an electronic processor configured to perform the steps of:
- selecting a ring R, an ideal q of R, and a hash function;
- generating elements f and g of the ring R, and generating an element $f^{-1}$ that is an inverse of f in the ring R modulo q;
- producing a public key that includes h where h is equal to a product that can be derived using g and $f^{-1}$;
- producing a private key from which f and g can be derived;
- producing a message digest m by applying the hash function;
- encrypting the message digest using the public key;
- decrypting the message using the private key
- the system further comprising an optical processor configured to perform Fourier transform processing and compute a multiplication in the ring R for producing the message digest m.

In contrast to the prior art, in certain embodiments, multiplications are performed in a ring of multinomials, instead of polynomials (in prior systems, the message and keys being cast as polynomials before performing encryption or decryption). According to embodiments of the invention, the multiplications are cast as multinomials with two variables (or more), being equivalent to two-dimensional (or higher) convolutions which can be accelerated using optical Fourier transforms.

The public-key cryptosystem methodology outlined herein as "NTRU2D" is based on NTRU but using a different set of public and private keys as well as a different algebraic structure. It is a multi-dimensional (at least two-dimensional) system, which synergistically allows for implementation on an optical device performing a two-dimensional discrete Fourier transform. The resulting system works similarly to NTRUEncrypt from a user point of view, but with different internal mechanics. Advantageously, the system can be straightforwardly extended to a higher number of dimensions, although the two-dimensional version is probably the best-suited for optical implementation.

The method could be efficiently implemented on optical chips of the type developed by Optalysys Ltd, leading to potentially decreased runtimes and smaller power consumption. PCT/EP2020/065740 illustrates examples of optical systems and is incorporated by reference.

In a subsidiary aspect, the ring R of multinomials is represented by the formula $Z[x, Y]/<X^{N_1}-1, Y^{N_2}-1>$, where $(N_1, N_2) \in \mathbb{N}^{*2}$, wherein $N_1$ and $N_2$ are prime numbers.

In a subsidiary aspect, the message digest m is cast as a multinomial representing a 2D array. Accordingly, multiplications may be performed modulo two (or more) polynomials. In the prior art, the correspondence between polynomial multiplication and convolution is due to a reduction (mathematically, a modulo operation) using a fixed polynomial, whose degree is one of the parameters of the cryptosystem. Advantageously, the degrees here are two parameters of the cryptosystem.

In a further subsidiary aspect, the method further comprises the step of performing a multinomial multiplication in the ring R of multinomials using Fourier transform processing. The multiplication may thus be component-wise multiplication. In further subsidiary aspect the method further comprises the step of applying an inverse Fourier transform and representing the message digest m as a multinomial.

In a preferred embodiment, the Fourier transform (and inverse Fourier transform) processing is implemented optically. This provides enhanced security and potential faster processing.

In a further subsidiary aspect, performing the multinomial multiplication comprises the step of reducing coefficients of a product of multinomials. In an embodiment, the step of reducing coefficients comprises reducing the amplitude of the individual coefficients of the multinomials to be multiplied. In an alternative embodiment, the step of reducing coefficients comprises reducing degrees of the multinomials to be multiplied. Advantageously, each of these algorithms compensates for potential low output accuracy of optical systems.

In a preferred embodiment, using a combination of these two algorithms, multinomial multiplication can be performed on a low-accuracy device at the expense of an increased runtime. They can in principle be applied to NTRU or NTRUPrime as well as NTRU2D.

In a subsidiary aspect, the security of the cryptosystem is related to the difficulty of solving a short vector problem (which can be proved using tensors, instead of matrices for the prior art). Accordingly, the reduction involves a different type of mathematical objects compared to the prior art.

In a subsidiary aspect, using Fourier transform processing may comprise performing a block decomposition for a discrete 2D Fourier transform. One advantage of such a decomposition is to reduce the maximum modulus of the Fourier coefficients of each block, thus potentially improving the accuracy. For example, a typical workflow can be:
1. Perform the Fourier transform on each block using a fast but low-accuracy device.
2. Combine the results to compute the full Fourier transform on a slower, high-accuracy device.

In a further broad aspect, the invention provides a system comprising an electronic processor configured to perform the steps of:
  selecting a ring R of multinomials, an ideal q of R, and a hash function;
  generating elements f and g of the ring R, and generating an element $f^{-1}$ that is an inverse of f in the ring R modulo q;
  producing a public key that includes h where h is equal to a product that can be derived using g and $f^{-1}$;
  producing a private key from which f and g can be derived;
  producing a message digest m by applying the hash function to the digital message, the message digest being represented as a multinomial in the ring R;
  encrypting the message digest using the public key;
  decrypting the message using the private key.

In a subsidiary aspect, the system comprises an optical processor configured to perform Fourier transform processing to carry out a multinomial multiplication in the ring R of multinomials.

In a further broad aspect, the invention provides a method for encrypting and decrypting a digital message, the method comprising the steps of:
  selecting a ring R, an ideal q of R, and a hash function;
  generating elements f and g of the ring R, and generating an element $f^{-1}$ that is an inverse of f in the ring R modulo q;
  producing a public key that includes h where h is equal to a product that can be derived using g and $f^{-1}$;
  producing a private key from which f and g can be derived;
  producing a message digest m by applying the hash function to the digital message;
  encrypting the message digest using the public key;
  decrypting the message using the private key,
  wherein in the step of producing the message digest m, a multiplication is computed in the ring R of using Fourier transform processing implemented optically.

In a further broad aspect, the invention provides a system comprising an electronic processor comprising the steps of:
  selecting a ring R, an ideal q of R, and a hash function;
  generating elements f and g of the ring R, and generating an element $f^{-1}$ that is an inverse of f in the ring R modulo q;
  producing a public key that includes h where h is equal to a product that can be derived using g and $f^{-1}$;
  producing a private key from which f and g can be derived;
  producing a message digest m by applying the hash function to the digital message;
  encrypting the message digest using the public key;
  decrypting the message using the private key,
  the system further comprising an optical processor configured to perform Fourier transform processing and compute a multiplication in the ring R for producing the message digest m.

In a further broad independent aspect, the invention provides a method for encrypting and decrypting a digital message, the method comprising the steps of:
  selecting a ring R of multinomials, an ideal q of R, and a hash function;
  generating elements f and g of the ring R, and generating an element $f^{-1}$ that is an inverse of f in the ring R modulo q;
  producing a public key that includes h where h is equal to a product that can be derived using g and $f^{-1}$;
  producing a private key from which f and g can be derived;
  producing a message digest m by applying the hash function to the digital message, the message digest being represented as a multinomial in the ring R;
  encrypting the message digest using the public key;
  decrypting the message using the private key.

As a public-key cryptosystem, embodiments of the present invention can be advantageously used in secure communication, including banking applications. It could be used, for instance, to exchange keys between two participants over an untrusted channel and establish a secure communication protocol.

In a subsidiary aspect, in accordance with any of the preceding aspects, if the number of variables is smaller or larger than 2, the optical Fourier transform is computed by performing sequential one- and two-dimensional Fourier transforms.

In a subsidiary aspect, in accordance with any of the preceding aspects, the two-dimensional transforms are performed either directly using the optical system or in sequential steps using a Cooley-Tukey algorithm.

In a subsidiary aspect, in accordance with any of the preceding aspects, the one-dimensional transforms are performed using a modification of a Cooley-Tukey algorithm with different twiddle factors.

DETAILED DESCRIPTION

1 Introduction

Figure 1:
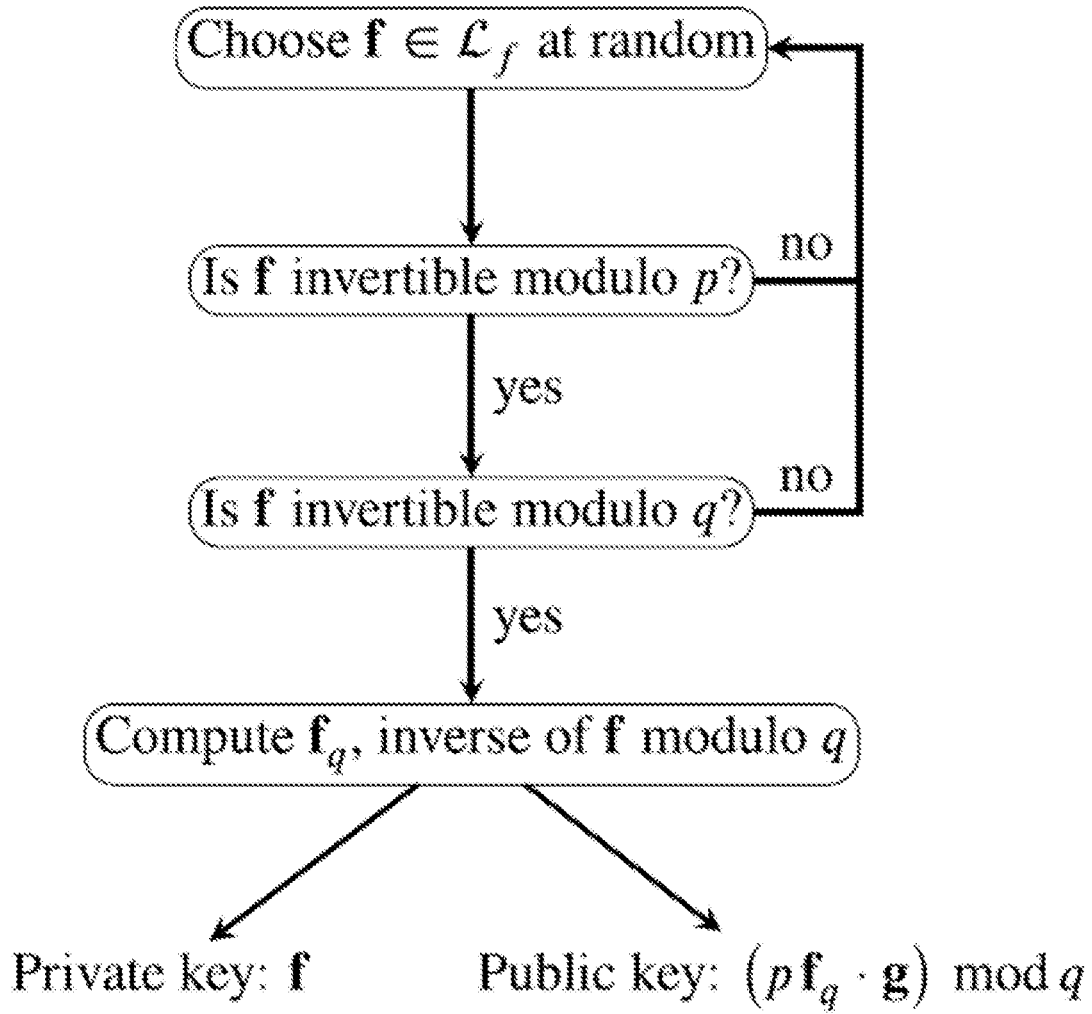
FIG. 1 shows a flow diagram in accordance with an embodiment of the invention.

NTRU is a public-key cryptosystem first proposed in 1996 [1], published in 1998 [2], and in the public domain since 2017. It consists of two families of systems: NTRU-Encrypt, an asymmetric encryption scheme, and NTRUSign, a digital signature scheme. Contrary to most current schemes based on arithmetic problems which are prone to quantum attacks (using for instance Shor's algorithm), NTRU is based on lattice problems against which no efficient attack is known, and which are conjectured to be impossible to break in polynomial time. (The term 'conjectured' here is understood in a strong sense: decades of research on these problems and attempts at breaking them have found no evidence that they can be broken in polynomial time.) No security vulnerability was found in the more than twenty years since it was first proposed, and it is thought to be resistant against both classical and quantum attacks.

A provably secure (but less efficient) version was proposed in 2013 [3] and is currently studied by the European commission [4] as a possible future-proof alternative to current cryptosystems. Another version, called NTRU Prime, was proposed in 2016 [5] to remove some algebraic structures which might introduce weaknesses-specifically to reduce the number of automorphisms and other endomorphisms of the ring of polynomials in which calculations are performed. (However, at the time of writing, no efficient attack making use of these structures is known.)

(A ring $(R, +, \circ)$ is a set R with two binary internal operations $R \times R \to R$, hereafter denoted by $+$ and $\circ$, satisfying the following axioms:

1. $(R, +)$ is an abelian group, i.e.,
    + is associative: for each $(a, b, c) \in R^3$, $(a+b)+c=a+(b+c)$.
    + is commutative: for each $(a, b) \in R^2$, $a+b=b+a$.
    There exists an element of R, called 0, such that, for each $a \in R$, $a+0=a$.
    For each $a \in R$, there exists $b \in R$ such that $a+b=0$.
2. $(R, \circ)$ is a monoid, i.e.,
    $\circ$ is associative: for each $(a, b, c) \in R^3$, $(a \circ b) \circ c = a \circ (b \circ c)$.
    There exists an element of R, called 1, such that, for each $a \in R$, $a \circ 1 = 1 \circ a = a$.
3. $\circ$ is distributive over $+$, i.e.,
    for each $(a, b, c) \in R^3$, $a \circ (b+c) = (a \circ b)+(a \circ c)$ (left distributivity).
    for each $(a, b, c) \in R^3$, $(a+b) \circ c = (a \circ c)+(b \circ c)$ (right distributivity).

Both the original NTRUEncrypt and NTRU Prime have advanced to the second round of the NIST Post-Quantum Cryptography Standardization project (https://csrc.nist.gov/projects/post-quantum-cryptography/round-2-submissions). Besides its expected post-quantum security, the NTRU family also makes key generation particularly efficient [6], opening possible use cases where the key needs to be changed regularly.

Central to the NTRU algorithms are polynomial multiplications in a finite ring. These operations can be mapped to convolutions of vectors, and thus have efficient implementations in Fourier space. For this reason, the optical Fourier transform of embodiments of the invention can significantly increase the speed and decrease the power consumption of the algorithm.

Naive polynomial multiplication has a complexity $O(n^2)$ where n is the degree of the polynomials. A recursive algorithm splitting each polynomial in two reduces the number of required scalar multiplications to $$O(n^{\log_2(3)})$$

at the expense of some overhead. An algorithm based on the fast Fourier transform has a complexity $O(n \log n)$. Using an optical Fourier transform can, in certain embodiment, reduce it to $O(n)$, with the Fourier transform being performed in $O(1)$ runtime.

Example of Possible Application:

A public-key cryptosystem can be used, for instance, in inter-device communication in an Internet of Things network. To take a specific example, two devices would need to communicate securely to exchange personal data about a user (e.g., medical data exchanged between one device used to perform a diagnostic and a hospital storage system) which need to be protected from external unauthorized access. A secure communication channel could be opened between the two devices via the exchange of encryption ciphers, or keys for any other encryption system, which would themselves be encrypted using a public-key cryptosystem to prevent interception by any external actor. For devices operating on low power, making the cryptosystem secure enough would be challenging with current technology. The cryptosystem proposed here will alleviate this problem as its most computationally intensive operation can be performed optically, significantly reducing the power usage.

2 the NTRUEncrypt Family 2.1 Description of the Algorithm

NTRUEncrypt is a family of cryptosystems with three parameters N, p, and q in ℕ* such that N is a prime number (see Appendix A.2), $q > p$, q and p are coprime.

It involves polynomial multiplications in the ring $R = \mathbb{Z}[X]/\langle X^N - 1 \rangle$, which can be recast as a convolution and efficiently performed in Fourier space (see appendix A.1.1).

As any public-key cryptosystem, it involves three steps: generation of private and public keys, encryption of a message, and decryption. We now describe each of these steps.

Generation of public and private keys, with reference to FIG. 1: The private key is a doublet $(f, f_p)$ where f is an element of R with coefficients in $\{-1, 0, +1\}$ which has an inverse modulo p and an inverse modulo q, $f_p$ is the inverse of f modulo p, i.e., $f \cdot f_p = 1 \mod p$, where $\cdot$ denotes the multiplication in R.

(Technically, $f_p$ can be recovered from f, so the private key may be taken as f only. However, in practice it is generally more convenient to save $f_p$ rather than to re-compute it at the decryption stage [6]. The requirement that the coefficients of f be between $-1$ and $+1$ can be relaxed in practice; although they must still be 'small'.)

The public key is the polynomial h obtained by multiplying p, the inverse $f_q$ of f modulo q, and a polynomial g in R with coefficients in $\{-1, 0, +1\}$, and taking the result modulo q: $h = (p f_q \cdot g) \mod q$.

An embodiment concerning how the inverse of a polynomial modulo $X^N - 1$ can be computed in appendix A.3.1. To get $f_p$ and $f_q$, the Euclidean algorithm described there must be performed with $K = \mathbb{Z}_p$ and $K = \mathbb{Z}_q$, respectively. The relation with a short vector problem is outlined in appendix A.4.1.

Figure 2:
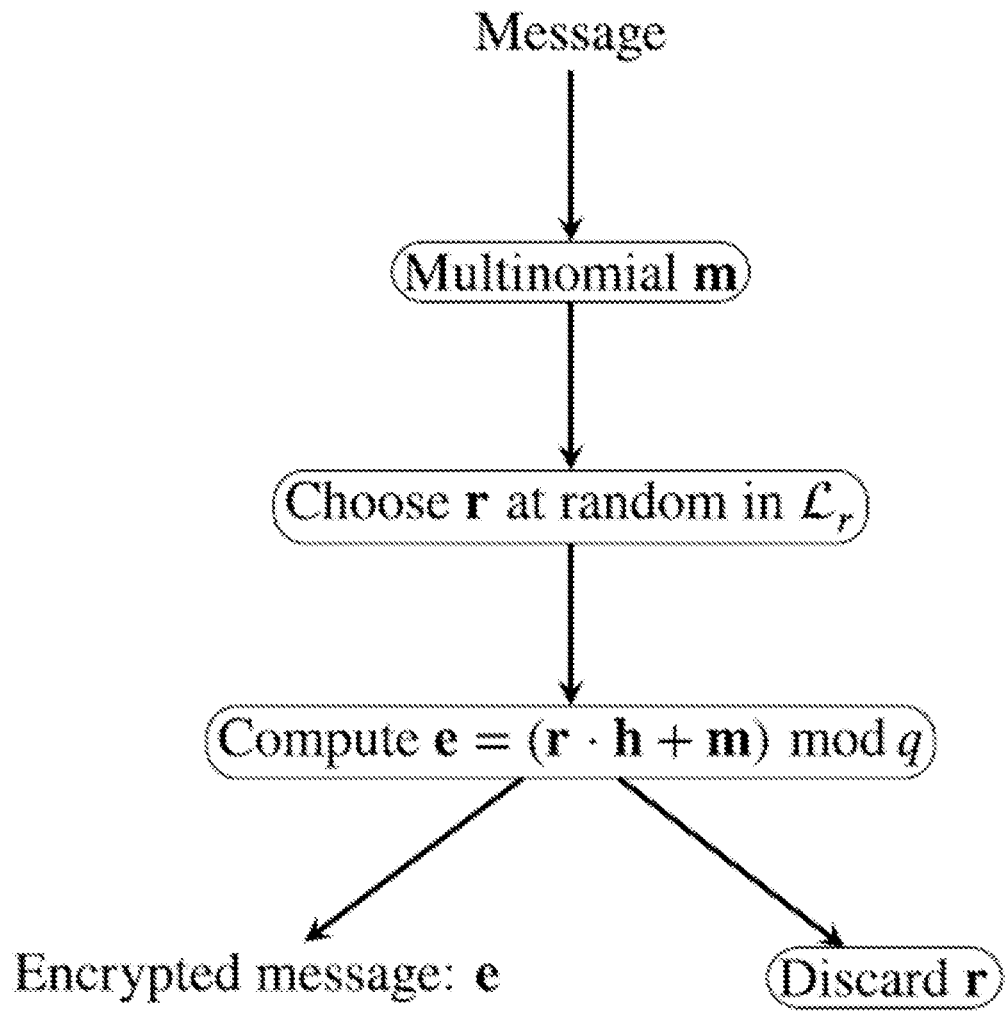
FIG. 2 shows a flow diagram in accordance with an embodiment of the invention.

Encryption, with reference to FIG. 2: The encryption procedure is:

1. Represent the message as a polynomial m in R with coefficients between $1 - \lceil p/2 \rceil$ and $\lfloor p/2 \rfloor$.
2. Choose a random polynomial r in R with relatively small coefficients.
3. Compute the encrypted message e given by $e = (r \cdot h + m) \mod q$.
    Discard the polynomial r.

It is important that r be never revealed.

Figure 3:
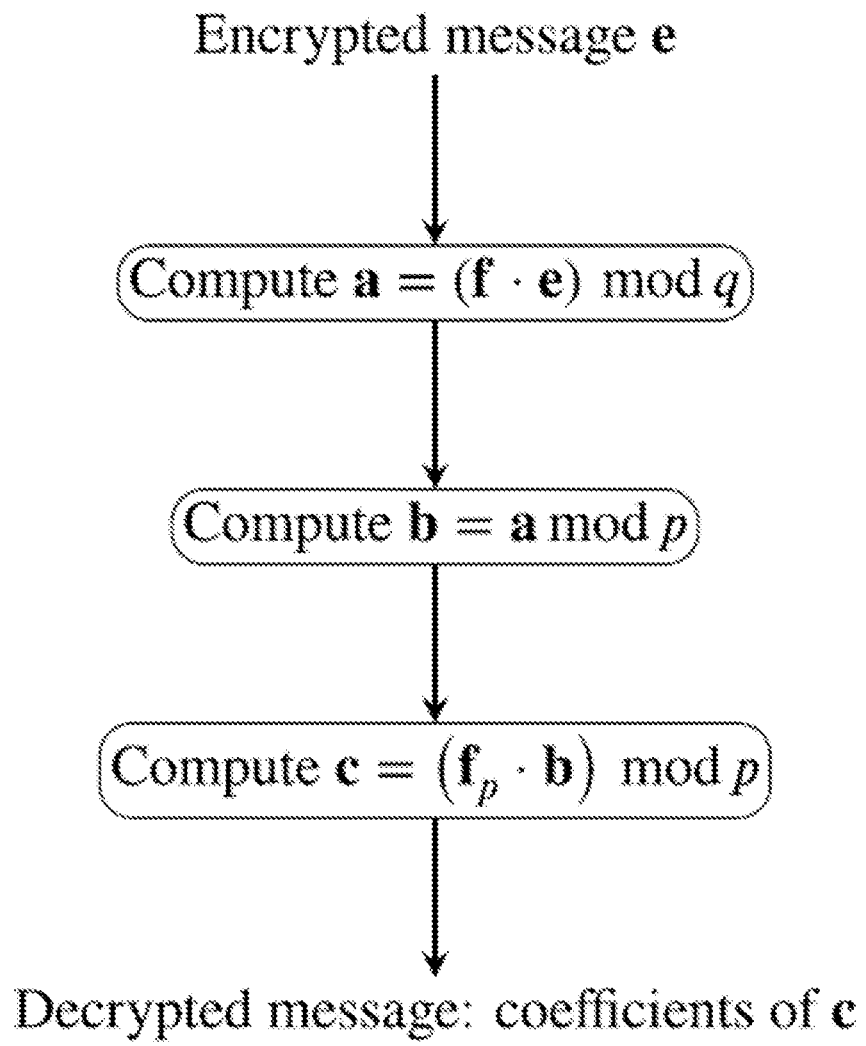
FIG. 3 shows a flow diagram in accordance with an embodiment of the invention.

Decryption, with reference to FIG. 3: For the decryption, all the modulo operations are centred: for any integer n, a quantity modulo n is taken between $1 - \lceil n/2 \rceil$ and $\lceil n/2 \rceil$. The decryption procedure is:

1. Compute $a = (f \cdot e) \mod q$. Using the definitions of e and h, we have: $a = (p r \cdot g + f \cdot m) \mod q$. If q is sufficiently large and r is sufficiently small, we then have $a = p r \cdot g + f \cdot m$. In the following, we assume this is true.

NB: This is always true if $$\left\lceil \frac{q}{2} \right\rceil - 1 \geq p\|r\|_1 + \left\lfloor \frac{p}{2} \right\rfloor N,$$

where $\|\ \|_1$ denotes the sum of the absolute values of the coefficients. One can relax the assumption on q by imposing some conditions on the private key. Indeed, the condition a=pr·g+f·m is satisfied for any message m provided $$\left\lceil \frac{q}{2} \right\rceil - 1 \geq p\|r\|_1 + \left\lfloor \frac{p}{2} \right\rfloor \|f\|_1.$$

2. Compute b≡a mod p. This gives b≡(f·m)mod p.
3. Compute c=($f_p$·b)mod p. It should be equal to m.

2.2 Practical Considerations

Secure parameters: Provided the parameters are chosen so that a short vector for the lattice of appendix A.4.1 cannot be found using lattice reduction techniques, the most efficient known attacks at the time of writing are meet-in-the-middle attacks. Their complexity is the square root of that of a brute-force attack [6]. Typically, the polynomials f, g, and r are chosen to have a fixed number of 1s, −1s, and 0s. If a polynomial has $d_+$ positive coefficients and $d_-$ negative ones, this leaves M/($d_+$!$d_-$! (N−$d_+$−$d_-$)) possibilities. The complexity $C_{MITM}$ of a meet-in-the-middle attack is thus, up to a prefactor, $$C_{MITM}(N, d_+, d_-) \approx \sqrt{\frac{N!}{d_+!\, d_-!\, (N - d_+ - d_-)}}$$

In 2012, the company Security Innovation, which held the NTRU patents, proposed the following sets of parameters in its NTRU tutorial (https://web.archive.org/web/20120606210107/http:/www.securityinnovation.com/security-lab/crypto/155.html, see also the article [6]). Here $d_f$, $d_g$, and $d_r$ are the numbers of 1s in the polynomials f, g, and r, respectively. The former has one fewer −1s than it has 1s; the others have has many −1s as they have 1s, and the other coefficients are 0. The 'security' columns give the numbers of bits of security against meet-in-the-middle attacks as given in [6]. (We show them only when given by the NTRU team.) The key security is given by:

$$\frac{1}{2}\log_2[(N2d_g)(2d_gd_g)] = \frac{1}{2}\log_2\left[\frac{N!}{(N-2d_g)!\,(d_g)!^2}\right],$$

i.e., half the logarithm in base 2 of the number of possible polynomials g. Similarly, the message security is given by $$\frac{1}{2}\log_2[(N2d_r)(2d_rd_r)] = \frac{1}{2}\log_2\left[\frac{N!}{(N-2d_r)!\,(d_r)!^2}\right].$$

More parameters can be found in table 2.1 of [7].

NB: These parameters are still susceptible to multiple transmission attacks [6]: if the same message is sent several times using different random vectors r, an attacker could recover most of their coefficients by multiplying the difference between encrypted messages by a pseudo-inverse of h. As described in [6], this and some other attacks can be parried by appending a hash and the output of a generating function to the message before encryption. (The modified message is sometimes called a digital envelope, parrying multiple transmission attacks.) Similarly, if g(1)=0, we have e(1)=m(1), so that some information is leaked. This can be prevented by reserving one coefficient of the message to ensure m(1) has a specified value (e.g. 0) independent of the information to be conveyed. The resulting workflow is schematically represented in FIGS. 4 and 5.

Figure 4:
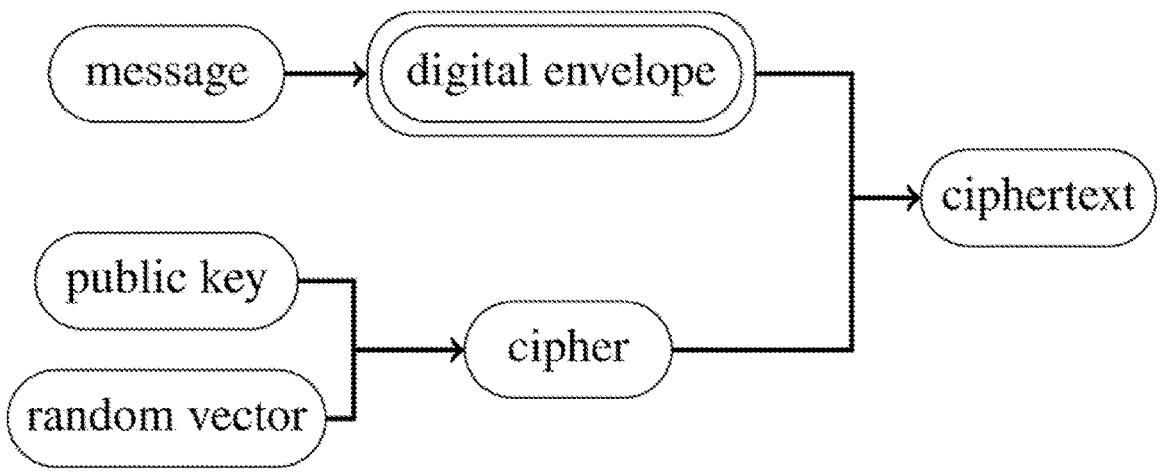
FIG. 4 shows a flow diagram in accordance with an embodiment of the invention.
Figure 5:
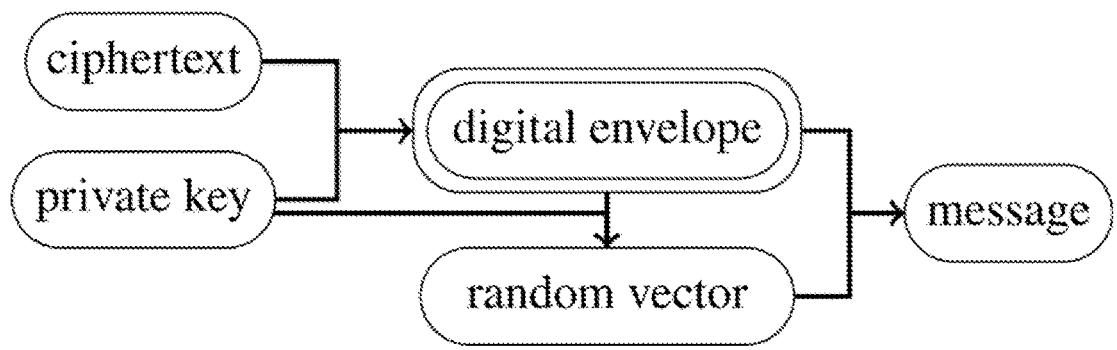
FIG. 5 shows a flow diagram in accordance with an embodiment of the invention.

FIG. 4 is a schematic representation of the NTRU encryption workflow. The message and digital envelope elements can be publicly revealed without security issues. The random vector and cipher elements should never be revealed. FIG. 5 is a schematic representation of the NTRU decryption workflow. The random vector is the same as that used for encryption.

A chosen ciphertext attack is described in reference [8], making use of the fact that some messages are not decrypted correctly to learn information on the private key. This and other similar attacks can in principle be parried using the construction described in reference [9], which makes NTRUEncrypt indistinguishable against adaptive chosen-ciphertext attack (IND-CCA2) (see also [10, 11] and references therein).

More recent estimates (see for instance the presentation [12]) suggest choosing the polynomial f in the form f=1+pF, where F has $d_f$ coefficients equal to 1, $d_f$ equal to −1, and its other coefficients vanish, with one of the following parameter sets and p=3, shown in the following table:

| N | q | $d_f$ | $d_g$ | $d_m$ | Classical security | Quantum security |
|---|---|---|---|---|---|---|
| 443 | 2048 | 148 | 148 | 115 | 128 | 128 |
| 587 | 2048 | 169 | 196 | 157 | 192 | 128 |
| 743 | 2048 | 247 | 247 | 204 | 156 | 128 |

Performance of electronic implementations: The NTRU project (https://tbuktu.github.io/ntru/) reports (as of 14 May 2020) about 30,000 encryption operations per second, 22,000 decryption operations per second, or 2,000 key generations per second with 256 bits of security on an Intel Xeon™ at 1.6 GHz.

Two low-power implementations of NTRU on specialized hardware are proposed in for the 'moderate security' parameters. The encryption-only design requires 1.72 µW and encryption takes a bit more than 56 ms. The encryption-decryption design requires about 6 µW; encryption and decryption take about 56.78 ms and 119.23 ms respectively.

2.3 NTRU Prime

The NTRU Prime family of cryptosystems (see also the ntruprime.cr.yp.to website) is a tweak of the original NTRU proposal using rings with a different structure; see reference [5]. Its development was motivated by recent quantum attacks against the Ideal-SVP [14, 15] casting doubts on the future-proofness of cryptosystems relying on cyclotomic rings.

(A cyclotomic ring is a ring of integers of the number field $\mathbb{Q}(\epsilon)$ where $\epsilon$ is a complex root of unity. One can show that it is equal to $\mathbb{Z}[E]$, i.e., the ring of polynomials in $\epsilon$ with integer coefficients. If $\epsilon$ is a root of the identity and n is the smallest positive integer such that $\epsilon^n=1$, the ring of integers of $\mathbb{Q}(\epsilon)$ is isomorphic to $$\frac{Z[X]}{\langle X^n - 1 \rangle}\Big)$$

While these are not known to affect the security of NTRU, working with different rings is expected to reduce the probability that successful attacks will be found in the near- or medium-term future. NTRU Prime is currently a second-round candidate in the NIST Post-Quantum Cryptography Standardization Project (https://csrc.nist.gov/projects/post-quantum-cryptography).

The central idea of NTRU Prime is to work in the ring of polynomials $\mathbb{Z}[X]/\langle X^N-X-1 \rangle$ for some prime number N, to reduce the number of automorphisms and other endomorphisms which might be used to construct attacks. It comes in two variants: Streamlined NTRU Prime and NTRU LPRime. The first one is extensively described in [5]. Besides the use of different rings, it also eliminates the possibility of decryption failures (by setting a lower bound on the value of the parameter q) and introduces a rounding mechanism which simplifies protection against chosen-ciphertext attacks. However, using Fourier transform methods to perform polynomial multiplications in this ring is more intricate. It is also not clear to what extent the change of ring precisely affects security beyond the speculation (supported by past examples) that reducing the number of endomorphisms may prevent yet-to-be-discovered attacks.

In general, if G is a subring of a field K and P is a polynomial of degree N with N distinct roots in K, then multiplication in the ring $$R = \frac{G[X]}{\langle P(X) \rangle}$$

is equivalent to component-wise multiplication of vectors after the change of basis given by the Vandermonde matrix of the roots of P. Indeed, if a and b are two elements of R, A and B are the vectors of their coefficients, c=ab, C the vector of coefficients of c, W the vandermonde matrix of the roots of P, and if a cross denotes the component-wise multiplication, then WC=(WA)×(WB). (This works because c(x)=a(x)b(x) provided x is a root of P) If $P(X)=X^n-1$, then multiplication amounts to a discrete Fourier transform.

3 NTRU2D 3.1 Description 3.1.1 the NTRU2D Cryptosystem

A bi-variate version of the algorithm described in section 2.1, is described, replacing the ring of polynomials $Z[X]/\langle X^N-1 \rangle$ by $Z[X, Y]/\langle X^{N_1}-1, Y^{N_2}-1 \rangle$, where $(N_1, N_2) \in \mathbb{N}^{*2}$.

Parameters:
two prime numbers $N_1$ and $N_2$,
two coprime positive integers p and q such that q>p,
three subsets $\mathcal{L}_f$, $\mathcal{L}_g$, and $\mathcal{L}_h$ of the ring $R'=\mathbb{Z}[X, Y]/\langle X^{N_1}-1, Y^{N_2}-1 \rangle$.

Private key: A multinomial $f \in \mathcal{L}_f$ which has an inverse in R' modulo p, hereafter called $f_p$, and an inverse in R' modulo q, hereafter called $f_q$.

Public key: Choose a multinomial g in $\mathcal{L}_g$. The public key is the multinomial h given by $h=(pf_q \cdot g) \bmod q$.

Encryption:
1. Represent the message as a multinomial m in R with coefficients between $1-\lceil p/2 \rceil$ and $\lfloor p/2 \rfloor$.
2. Choose randomly a multinomial r in $\mathcal{L}_r$.
3. Compute the encrypted message e given by $e=(r \cdot h+m) \bmod q$.
4. Discard the polynomial r.

It is important that r be never revealed.

Decryption: For the decryption, all the modulo operations are centred: for any integer n, a quantity modulo n is taken between $1-\lceil n/2 \rceil$ and $\lfloor n/2 \rfloor$. The decryption procedure is:
1. Compute $a=(f \cdot e) \bmod q$. Using the definitions of e and h, we have: $a=(pr \cdot g+f \cdot m) \bmod q$. If q is sufficiently large and the involved multinomials are sufficiently small, we then have $a=pr \cdot g+f \cdot m$. In the following, we assume this is true.
2. Compute $b \equiv a \bmod p$. This gives $b \equiv (f \cdot m) \bmod p$.
3. Compute $c=(f_p \cdot b) \bmod p$. It should be equal to m.

Typically, the three sets $\mathcal{L}_f$, $\mathcal{L}_g$, and $\mathcal{L}_r$ contain multinomials with small $L^2$ norms. As shown in appendix A.4.3, finding the private key from the publicly-known parameters and public key is then as hard as solving a short vector problem.

NB: As for NTRUEncrypt, the message can, and probably should in real-world applications, be enclosed in a digital envelope before the step 3 of encryption to increase the level of security.

NB2: This cryptosystem can be generalized to a higher number of variables.

The encryption and decryption steps both rely on multinomial multiplication, which can be accelerated by making use of an optical computing device. Here, it is proposed a possible implementation using two devices: an electronic one and an optical one. It is illustrated on FIG. 6.

The two multinomials to be multiplied, $m_1$ and $m_2$, are both cast as two-dimensional arrays by the electronic device. The arrays are sent to the optical device.

The optical device performs the discrete Fourier transform of each array.

The results can either be multiplied on the optical device if it supports this operation, or sent to the electronic one, multiplied, and the result sent back to the optical device.

The optical device performs the inverse Fourier transform of the result.

The result is sent to the electronic device where it is cast as a multinomial.

This procedure can be used to compute the products at step 4 in FIG. 2 and steps 2 and 4 in FIG. 3.

In practice, the first and last steps may not be required if the input or desired output are two-dimensional arrays rather than multinomials. For instance, the full NTRU2D workflow (including the key generation, encryption, and decryption) may be performed using two-dimensional arrays in place of multinomials, with each coefficient of the multinomials being identified with the corresponding coefficient in one of the arrays.

The inverse Fourier transform of the fourth step may also be replaced by a direct Fourier transform. A rescaling of the output is then required, which may be performed either immediately or at a later stage.

An embodiment will now be described in more details of one possible implementation. The data could be sent to the optical device via an optical fibre link, hereafter called the input link. For instance, it could be encoded in the intensity of monochromatic coherent light emitted by a laser upstream and modulated by a series of heaters or Mach-Zehnder interferometers. Said light would be collimated, e.g. by passing through a series of lenses, before passing through a single lens placed one focal distance away from the collimation plane. It could then be focused into another optical fibre link, hereafter called the output link, by another array of lenses. The signal could then either be converted to an electronic signal by photodiodes at the end of the output link and sent to the electronic device, or sent to the output link of the same or another optical device for further optical processing.

In one embodiment, the optical device would compute only the absolute value of the Fourier transform of the signal. The procedure should then be repeated twice, with two different constants added to the input signal, to recover the full Fourier transform.

In another embodiment, the optical device would compute the full Fourier transform of the signal.

In either of said embodiments, the procedure could be repeated several times to increase the accuracy of the output. The input data would first be split into several datasets with a smaller magnitude by the electronic device. Each dataset would be processed separately by the optical device and sent to the same or another electronic device. Said electronic device would then combine the outputs.

Said optical processing could be performed using the technology patented by Optalysys Ltd.

3.1.2 Probability of Decryption Failure

The decryption process may fail if the polynomial a has at least one coefficient smaller than $1-\lceil q/2 \rceil$ or larger than $\lfloor q/2 \rfloor$. Let us estimate the probability of this event. To make things simple, here we assume that the polynomials r, g, and f have coefficients in $\{-1, 0, +1\}$, they have at most, respectively, $N_r$, $N_g$, and $N_f$ nonvanishing coefficients. Call N the product $N_1 N_2$.

First, notice that decryption will always succeed if p min $(N_r, N_g) + \lfloor P/2 \rfloor N_f \leq \lceil q/2 \rceil - 1$. To estimate the probability of decryption failure when this condition is not satisfied, assume, in one embodiment, that the probability distribution for the values of each coefficient in each of the polynomials f, g, and r is independent of its position. The probability that at least one coefficient of a is too large is then bounded (from above) by N multiplied by the probability that its first coefficient is too large.

An embodiment first looks at the distribution of values for the product r·g. Call $N_r^{(+)}$ the number of positive coefficients of r, $N_r^{(-)}$ the number of negative coefficients, and similarly for g with the letter r replaced by g. Optionally, assume these four numbers are fixed. The probability that a number $n_{++}$ of +1s in r coincide with +1s of g and a number $n_{+-}$ of them coincide with -1s in g and similarly for -1s with the first index of n replaced by—is, for $$n_{++} + n_{+-x} \leq N_r^{(+)} \text{ and } n_{-+} + n_{--} \leq N_r^{(-)}:$$

$$\frac{\binom{N_g^{(+)}}{n_{++}}\binom{N_g^{(-)}}{n_{+-}}\binom{N_g^{(+)} - n_{++}}{n_{-+}}\binom{N_g^{(-)} - n_{+-}}{n_{--}}}{\binom{N - N_g^{(+)} - N_g^{(-)}}{N_r^{(+)} - n_{++} - n_{+-}}\binom{N - N_g^{(+)} - N_g^{(-)} - N_r^{(+)} + n_{++} + n_{+-}}{N_r^{(-)} - n_{-+} - n_{--}}}{\binom{N}{N_r^{(+)} + N_r^{(-)}}\binom{N_r^{(+)} + N_r^{(-)}}{N_r^{(+)}}}$$

which may be rewritten as:

$$\frac{N_g^{(+)}! N_g^{(-)}! N_r^{(+)}! N_r^{(-)}! (N - N_g^{(+)} - N_g^{(-)})! (N - N_r^{(+)} - N_r^{(-)})!}{N! n_{++}! n_{+-}! n_{-+}! n_{--}! (N_g^{(+)} - n_{++} - n_{+-})!}$$
$$(N_g^{(-)} - n_{+-} - n_{--})! (N_r^{(+)} - n_{++} - n_{-+})! (N_r^{(-)} - n_{-+} - n_{--})!$$
$$(N - N_g^{(+)} - N_g^{(-)} - N_r^{(+)} - N_r^{(-)} + n_{++} + n_{+-} + n_{-+} + n_{--})!$$

For each n∈Z, the probability that the first coefficient of r·g be equal to n is the sum of this expression over each positive of zero integer values of $n_{++}$, $n_{+-}$, $n_{-+}$, and $n_{--}$ such that $$n_{++} + n_{+-} \leq N_r^{(-)}; n_{-+} + n_{--} \leq N_r^{(-)},$$

and $n_{++} - n_{+-} - n_{-+} + n_{--} = n$ of this expression.

The expression (1), denoted by $P_{rg}$ below, can be simplified using the Stirling formula in the limit $N \to \infty$. Denote with the greek letter λ the ratio of each quantity (denoted by a letter N or n with subscripts and possibly a superscript) over N, and assume these ratios are fixed as/increases. It follows:

$$\log P_{rg} \underset{N \to \infty}{=} N\big[p\log\lambda_g^{(+)} + p\log\lambda_g^{(-)} + p\log\lambda_r^{(+)} + p\log\lambda_r^{(-)} +$$

$$p\log(1 - \lambda_g^{(+)} - \lambda_g^{(-)}) + p\log(1 - \lambda_r^{(+)} - \lambda_r^{(-)})$$

$$-p\log\lambda_{++} - p\log\lambda_{+-} - p\log\lambda_{-+} - p\log\lambda_{--} -$$

$$p\log(\lambda_g^{(+)} - \lambda_{++} - \lambda_{-+})$$

$$-p\log(\lambda_g^{(-)} - \lambda_{+-} - \lambda_{--}) - p\log(\lambda_r^{(+)} - \lambda_{++} - \lambda_{+-}) -$$

$$p\log(\lambda_r^{(-)} - \lambda_{-+} - \lambda_{--})$$

$$-p\log(1 - \lambda_g^{(+)} - \lambda_g^{(-)} - \lambda_r^{(+)} - \lambda_r^{(-)} + \lambda_{++} + \lambda_{+-} + \lambda_{-+} + \lambda_{--})\big]$$

$$-2\log N + O(1).$$

where the function p log is defined by:

$$p\log: \begin{pmatrix} \mathbb{R}_+^* \to \mathbb{R} \\ x \mapsto x \log x \end{pmatrix}.$$

Typically, the quantity Prg thus decreases exponentially with N. It is thus expected that large deviations from typical values in the coefficients of r·g will be (up to polynomial prefactors) exponentially unlikely as N becomes large.

To get a feel for how small this probability typically is, consider the case $\lambda_g^{(+)}=\lambda_g^{(-)}=\lambda_r^{(+)}=\lambda_r^{(-)}=1/4$ and $\lambda_{++}=\lambda_{--}=\lambda_{-+}=\lambda_{--}=1/16$, and work with base-2 logarithms. The following arises:

$$\log \mathcal{P}_{rg} \underset{N \to \infty}{=} N\left[4p\log\left(\frac{1}{4}\right) + 2p\log\left(\frac{1}{2}\right) - 4p\log\left(\frac{1}{16}\right) - 4p\log\left(\frac{1}{8}\right) - p\log\left(\frac{1}{4}\right)\right] - 2\log N + O(1),$$

$$\log \mathcal{P}_{rg} \underset{N \to \infty}{=} N\left[-2 - 1 + 1 + \frac{3}{2} + \frac{1}{2}\right] - 2\log N + O(1) = -2\log N + O(1).$$

For this particular set of values, the term linear in N vanishes and $P_{rg}$ scales like $N^{-2}$. However, for these values the first coefficient of r·g is 0, so the relatively high probability is not a problem. In one embodiment, now consider the case $\lambda_{++}=\lambda_{+-}=\lambda_{++}=1/8$, $\lambda_{-+}=\lambda_{--}=\lambda_{--}=0$. It follows:

$$\log \mathcal{P}_{rg} \underset{N \to \infty}{=}$$
$$N\left[4p\log\left(\frac{1}{4}\right) + 2p\log\left(\frac{1}{2}\right) - 4p\log\left(\frac{1}{8}\right) - 2p\log\left(\frac{1}{4}\right)\right] - 2\log N + O(1),$$

$$\log \mathcal{P}_{rg} \underset{N \to \infty}{=} N\left[-2 - 1 + \frac{3}{2} + 1\right] - 2\log N + O(1) = -\frac{N}{2} - 2\log N + O(1).$$

The probability of this configuration thus scales (up to polynomial factors) like $2^{-N/2}$.

Now consider the polynomial f·m. For definiteness, assume p=3 and that each coefficient of m is a random variable chosen uniformly and independently between −1 and +1. Then, the first coefficient of the product is the sum of independent, identically distributed random variables with a vanishing mean and a variance equal to 2/3. According to the central limit theorem, in the limit $N_f \to \infty$ its distribution becomes close to a Gaussian centred on 0 with variance $2N_f/3$. Denoting by $P_{mf}$ this probability distribution, it follows for each $n \in \mathbb{Z}$:

$$\mathcal{P}_{mf}(n) \underset{N_f \to \infty}{\sim} \sqrt{\frac{3}{4\pi N_f}} \exp\left(-\frac{3n^2}{4N_f}\right).$$

The probability that n differs from 0 by $\lambda N_f$, where $\lambda$ is a real number whose absolute value is noticeably smaller than 1 is thus:

$$\mathcal{P}_{mf}(\lambda N_f) \underset{N_f \to \infty}{\sim} \sqrt{\frac{3}{4\pi N_f}} \exp\left(-\frac{3N_f}{4}\lambda^2\right).$$

For $\lambda_0 > 0$, and up to a polynomial factor, the probability that $|(m \cdot r)(0)| > \lambda_0 N$ goes exponentially to 0 when $N \to \infty$.

From these results, and if it is assumed that q scales at least linearly with N, the probability of decryption failure should decrease exponentially in N.

3.2 Choice of Parameters and Security

An embodiment briefly envisages a possible choice of parameters. It is only given for illustration purposes: more research is required to say whether or not they are secure against combinations of lattice-reduction and meet-in-the-middle attacks.

One embodiment is configured to aim for parameters close to those recommended for NTRUEncrypt. The same values for q and p: q=1024 and p=3 may be chosen.

Optionally, choose $N_1$ and $N_2$ close to 20, e.g., $N_1=N_2=23$. Optionally, choose the polynomials f, g, and r to have respectively $d_f=149$, $d_g=148$, and $d_r=148$ coefficients equal to 1. The polynomials g and r are chosen to have as many coefficients equal to −1 as they have coefficients equal to 1, while f has one fewer of them, and its first coefficient is fixed to be 1. Call N the product $N_1 N_2$.

The number of bits of security $s_g$ of g against meet-in-the-middle attacks is:

$$s_g = \frac{1}{2}\log_2\left[\binom{N}{2d_g}\binom{2d_g}{d_g}\right] = \frac{1}{2}\log_2\left[\frac{N!}{(N-2d_g)!(d_g!)^2}\right] \approx 410.$$

The number of bits of security $s_f$ of f is:

$$s_f = \frac{1}{2}\log_2\left[\binom{N-1}{2(d_f-1)}\binom{2(d_f-1)}{d_f-1}\right] =$$
$$\frac{1}{2}\log_2\left[\frac{(N-1)!}{(N-2d_f+1)!((d_f-1)!)^2}\right] \approx 405.$$

Finally, the number of bits of security $s_r$ of r is:

$$s_r = \frac{1}{2}\log_2\left[\binom{N}{2d_r}\binom{2d_r}{d_r}\right] = \frac{1}{2}\log_2\left[\frac{N!}{(N-2d_r)!(d_r!)^2}\right] \approx 410.$$

Notice that decryption failures could be eliminated by choosing q such that $q \geq 4p \min(d_r, d_g) + 4d_f - 1 = 2371$. Provide an estimate of the decryption failure for q=1024. To make the analysis simpler, assume that each coefficient of g is chosen randomly in {−1, 0, +1}. This should provide an overestimate of the result, as a polynomial thus chosen will generally have fewer vanishing coefficients than actual possible choices for g. The probability that r·g takes a value $n_1 \in \mathbb{Z}$ and f·m a value $n_2 \in \mathbb{Z}$ is then, assuming $N_f$ and $N_r$ can be considered large, close to $$\frac{3}{4\pi\sqrt{N_f N_r}} \exp\left[-\frac{3}{4}\left(\frac{n_1^2}{N_r} + \frac{n_2^2}{N_f}\right)\right].$$

The probability Pe that the first coefficient of a be larger than $[q/2]-1$ in absolute value is thus of the order of $$\mathcal{P}_e \approx \frac{3}{2\pi\sqrt{N_f N_r}} \sum_{n=\lceil q/2 \rceil}^{\infty} \sum_{n_1} \exp\left[-\frac{3}{4}\left(\frac{n_1^2}{N_r} + \frac{(n-pn_1)^2}{N_f}\right)\right].$$

(The factor 2 n the coefficient of the sum accounts for positive and negative values.) Letting $n_1$ take real values for a moment, the argument of the exponential is maximized when $n_1$ takes a value such that $n_1/N_r = p(n-pn_1)/N_f$, i.e., $n_1 = pn/(p^2 + N_f/N_r)$. The argument of the exponential is then $$-\frac{3n^2}{4(p^2N_r + N_f)}.$$

It is maximized for n taking its smallest possible value. Assuming q can be considered large, we thus have:

$$\log_2 \mathcal{P}_e \approx -\frac{3q^2/(\ln 2)}{16(p^2N_r + N_f)} \approx -95.8,$$

where ln denotes the natural logarithm. The quantity $P_e$ is thus, assuming the approximations made are not too bad, smaller than $2^{-90}$. The probability that one coefficient of pr·g+f·m is larger than $[q/2]-1$ is smaller than $NP_e \approx 1 \times 10^{-26}$. We thus expect it to be negligible too. If necessary, the probability of decryption error can be further decreased by increasing q.

An algorithm to generate parameters for NTRUEncrypt is given in reference [16]. In certain embodiments, it is applicable, with minor modifications, to NTRU2D.

3.2.1 Runtime on a Low-Accuracy Device

In one embodiment, consider two multinomials a and b with at most/terms having, respectively, at most $N_a$ and $N_b$ nonvanishing coefficients, with absolute values bounded by $a_M > 0$ and $b_M > 0$. The maximum possible absolute value of the coefficients of a·b is min $(N_a, N_b)$ $a_M$ $b_M$.

Assume these multinomials have non-negative coefficients. Optionally, perform the multiplication using a device with a number $I_d$ of bits of accuracy, and which can deal with non-negative integers only.

Assume that $n_a$ times the procedure is performed as described in appendix B.1.1 and $n_d$ that described In appendix B.1.2. The multiplication of a and b can then be recast as the sum of products of multinomials where each term has coefficients with absolute value smaller than or equal to $$\left\lceil \frac{N}{2^n d} \right\rceil 2^{\lceil \log_2(a_M b_M)/2^n a \rceil}.$$

Each of them can thus be computed by the device if and only if $$\log_2 \left\lceil \frac{N}{2^n d} \right\rceil + \left\lceil \frac{\log_2(a_M b_M)}{2^n a} \right\rceil \leq l_d.$$

In the case of NTRU2D, take $N = N_1 N_2$ and $a_M = b_M = q-1$ for each multinomial product. The above condition becomes:

$$\log_2 \left\lceil \frac{N_1 N_2}{2^n d} \right\rceil + \left\lceil \frac{\log_2(q-1)}{2^n a} \right\rceil \leq l_d.$$

Taking $N_1 = N_2 = 23$ and $q=1024$, choosing $n_a=3$ and $n_d=5$, the left-hand side is smaller than 8. All multinomial multiplications should thus be doable on a device with 8 bits of accuracy in 15552 frames. Choosing $N_1 = N_2 = 15$ and $q=258$, a value smaller than 8 can be achieved by choosing $n_a = n_d = 3$, so that each term requires only 1728 frames. Assuming the device can run in the GHz range, we thus expect a throughput of the order of a million of multiplications per second for these parameters. More results are given in the following table.

| $N_1$ | $N_2$ | p | q | Number of frames of a 8-bits system |
|---|---|---|---|---|
| 23 | 23 | 3 | 1024 | 15552 |
| 23 | 23 | 3 | 258 | 15552 |
| 15 | 15 | 3 | 258 | 1728 |
| 5 | 5 | 3 | 124 | 48 |

These estimates are based on current generic algorithms to compute the Fourier transform on a low-accuracy device. In certain embodiments, they can be significantly improved by making use of more specific algorithms designed for multinomial multiplication modulo two polynomials and an integer.

Appendices

A

A.1 Multinomial Multiplication and Discrete Fourier Transform

A.1.1 Case of Polynomials

Here it is shown how polynomial multiplication in the ring R defined in section 2.1 can be performed in Fourier space. First, choose some notations. As in section 2.1, N is a positive integer and R is the ring $\mathbb{Z}[X]/\langle X^N - 1 \rangle$ of polynomials with integer coefficients modulo $X^N - 1$. Let a and b be two elements of R. Optionally call their coefficients, respectively, $a_0, a_1, \ldots, a_{N-1}$ and $b_0, b_1, \ldots, b_{N-1}$, so that $$a = \sum_{j=0}^{N-1} a_j X^j, \quad b = \sum_{j=0}^{N-1} b_j X^j.$$

Let · denote the product in R. We define c=a·b and call its coefficient $c_0, c_1, \ldots, c_{N-1}$, so that $$c = \sum_{j=0}^{N-1} c_j X^j.$$

Let a, b, and c be the N-dimensional vectors with components, respectively, $a_j$, $b_j$, and $c_j$, for j between 0 and N−1. (For simplicity, in this subsection we take vector indices from 0 to N−1.)

Optionally, denote with a ~ the discrete Fourier transform: for x∈ a, b, c, define the N-dimensional vector with components, $$\tilde{x}_u = \sum_{j=0}^{N-1} e^{-2i\pi ju/N} x_j, \quad u \in [[0, N-1]].$$

The inverse Fourier transform is given by $$\forall j \in [[0, N-1]], \quad x_j = \frac{1}{N} \sum_{u=0}^{N-1} e^{2i\pi ju/N} \tilde{x}_u.$$

For each j between 0 and N−1, the coefficient of order j in the polynomial c is:

$$c_j = \sum_{k=0}^{N-1} a_k b_{(j-k) \bmod N}.$$

For each j between 0 and N−1, it follows (using the equality $e^{2i\pi}=1$ to get the second line):

$$\tilde{c}_u = \sum_{j=0}^{N-1} e^{-2i\pi j u/N} \sum_{k=0}^{N-1} a_k b_{(j-k)\bmod N}$$

$$= \sum_{j=0}^{N-1}\sum_{k=0}^{N-1} e^{-2i\pi(k+((j-k)\bmod N))u/N} a_k b_{(j-k)\bmod N}$$

$$= \sum_{j=0}^{N-1}\sum_{k=0}^{N-1} \left[e^{-2i\pi k u/N} a_k\right]\left[e^{-2i\pi((j-k)\bmod N)u/N} b_{(j-k)\bmod N}\right]$$

$$= \left[\sum_{k=0}^{N-1} e^{-2i\pi k u/N} a_k\right]\left[\sum_{l=0}^{N-1} e^{-2i\pi l u/N} b_l\right],$$

where to get the last line, the new variable I=(j−k)mod N was defined, which varies between 0 and N−1 when k goes from 0 to N−1 for each j∈ℤ. This expression can be simplified as:

$$\tilde{c}_u = \tilde{a}_u \tilde{b}_u.$$

Polynomial multiplication in R is thus equivalent to component-wise multiplication in Fourier space.

A.1.2 Case of Multinomials

Let n∈ℕ* and $(N_1, N_2, \ldots, N_n) \in \mathbb{N}^{*n}$. Let R be the ring $$\frac{\mathbb{Z}[X_1, X_2, \ldots, X_n]}{\langle X_1^{N_1} - 1, X_2^{N_2} - 1, \ldots, X_n^{N_n} - 1\rangle}.$$

Let $$I = \prod_{i=1}^{n} [\![1, N_i]\!]$$

Optionally, denote the multiplication in R' by a dot. Let a and b be two elements of R', and c≡a·b.
Optionally, call a, b, and c the sequences of their coefficients, so that $$a = \sum_{I \in \mathcal{I}} a_I \prod_{i=1}^{n} X_i^{I_i}$$

and similarly for b and c. The latter is given by:

$$\forall I \in \mathcal{I}, c_I = \sum_{J \in \mathcal{I}} a_{(I_1-J_1)\bmod N_1, (I_2-J_2)\bmod N_2, \ldots, (I_n-J_n)\bmod N_n} b_J.$$

Optionally, denote with a ~ the discrete Fourier transform: for x∈a, b, c, x~ is the sequence with the same shape whose elements are given by:

$$\forall U \in \mathcal{I}, \tilde{x}_U = \sum_{I \in \mathcal{I}} x_I \prod_{i=1}^{n} e^{-2i\pi I_i U_i/N_i}.$$

The inverse transform is given by:

$$\forall I \in \mathcal{I}, x_I = \frac{1}{\prod_{i=1}^{n} N_i} \sum_{U \in \mathcal{I}} \tilde{x}_U \prod_{i=1}^{n} e^{+2i\pi I_i U_i/N_i}.$$

Let U∈I. It follows:

$$\tilde{c}_U = \sum_{I \in \mathcal{I}} c_I \prod_{i=1}^{n} e^{-2i\pi I_i U_i/N_i}$$

$$= \sum_{(I,J) \in \mathcal{I}^2} a_{(I_1-J_1)\bmod N_1, (I_2-J_2)\bmod N_2, \ldots, (I_n-J_n)\bmod N_n} b_J \prod_{i=1}^{n} e^{-2i\pi I_i U_i/N_i}$$

$$= \sum_{(I,J) \in \mathcal{I}^2} a_{(I_1-J_1)\bmod N_1, (I_2-J_2)\bmod N_2, \ldots, (I_n-J_n)\bmod N_n}$$

$$b_J \prod_{i=1}^{n} e^{-2i\pi((I_i-J_i)\bmod N_i)U_i/N_i} e^{-2i\pi J_i U_i/N_i}$$

$$= \left[\sum_{I \in \mathcal{I}} a_I \prod_{i=1}^{n} e^{-2i\pi I_i U_i/N_i}\right]\left[\sum_{J \in \mathcal{I}} b_J \prod_{j=1}^{n} e^{-2i\pi J_j U_j/N_j}\right].$$

This is equivalent to:

$$\tilde{c}_U = \tilde{a}_U \tilde{b}_U.$$

Multinomial multiplication in R' is thus equivalent to component-wise multiplication in Fourier space.

A.2 Integer Polynomial Factors of $X^N-1$

The reason why the parameter N must be prime in NTRU is that the polynomial $X^N-1$ must be the product of two prime polynomials in Z[X] to prevent some lattice-based attacks. These attacks won't be described here, but only give a simple argument showing that $X^N-1$ has more than two factors if N is not prime.

Let a and b be two integers larger than or equal to 2 and let us assume that N=a b. Then, $$X^N - 1 = (X^a)^b - 1$$

$$= (X^a - 1)(X^{a(b-1)} + X^{a(b-2)} + \cdots + X^{a(b-b)})$$

$$= (X^a - 1)\left(\sum_{i=0}^{b-1} X^{ai}\right)$$

$$= (X - 1)(X^{a-1} + X^{a-2} + \cdots + X^{a-a})\left(\sum_{i=0}^{b-1} X^{ai}\right)$$

$$= (X - 1)\left(\sum_{j=0}^{a-1} X^j\right)\left(\sum_{i=0}^{b-1} X^{ai}\right).$$

So, if N is not prime, $x^N-1$ can be expressed as the product of three non-unit polynomials.

A.3 Inverse of a Polynomial or Multinomial
A.3.1 Inverse of a Polynomial Let K be a field. Let P and S be two elements of K[X], i.e., two polynomials over K. Then, there exists a unique couple of polynomials. $(R, Q) \in K[X]^2$ such that the degree of R is smaller than that of S and P=QS+R. We say that Q is the quotient and R the remainder of the Euclidean division of P by S. (Q can be constructed monomial by monomial by matching the highest-order monomial in P, then the second-highest, and so on. Doing so, one can match all monomials in P with degrees smaller than or equal to that of S. What remains is R.)

Let $(P, Q) \in K[X]^2$, where the degrees of P and Q are at least 1 and that of P is smaller than that of Q. In order to see if P is invertible modulo Q, the Euclidean algorithm is applied:

1. Define $P_0=Q$ and $P_1=P$, and set i=1.
2. Perform the Euclidean division of $P_{i-1}$ by $P_i$, call the quotient $A_i$ and the remainder $P_{i+1}$.
3. If the degree of $P_{i+1}$ is larger than or equal to 1, increment i and go back to step 2.
4. If $P_{i+1}=0$, $P_i$ is a common divisor to Q and P. The polynomial P is thus not invertible modulo Q, If the degree of $P_{i+1}$ is zero and $P_{i+1} \neq 0$, we can go back to find an inverse of P modulo Q. Indeed, we have:

$$P_{i+1}=P_{i-1}-A_iP_i=P_{i-1}-A_i(P_{i-2}-A_{i-1}P_{i-1})=(1+A_iA_{i-1})P_{i-1}-A_iP_{i-2}=\ldots$$

Going backwards, we obtain a series of expressions of the form $$P_{i+1}=L_jP_{i-1-j}+R_jP_{i-j}$$

for j=0, 1, . . . , i, where the sequences $(L_j)$ and $(R_j)$ are defined by $L_0=1$, $R_0=-A_i$, and, for each j between 0 and i−1, $L_{j+1}=R_j$ and $R_{j+1}=L_j-A_{i-j-1}R_j$. Taking j=i−1 gives:

$$P_{i+1}=L_{i-1}Q+R_{i-1}P.$$

Since $P_{i+1}$ is a non-vanishing polynomial of degree 0, it is invertible (it is, up to the identifications of the unit polynomial with the unit of K, a nonvanishing element of K). We can thus write:

$$\frac{L_{i-1}}{P_{i+1}}Q + \frac{R_{i-1}}{P_{i+1}}P = 1,$$

which gives $$\frac{R_{i-1}}{P_{i+1}}P = 1 \bmod Q.$$

The polynomial $R_{i-1}/P_{i+1}$ is thus the inverse of P in $K[X]/\langle Q\rangle$.

A.3.2 Inverse of a Multinomial Modulo an Integer: Cyclic Case

Let p be a prime number, n be a positive integer, and $N_1, N_2, \ldots, N_n$ be n positive integers. Optionally, define the set $I=\Pi_{i=1}^n [[1, N_i]]$. Optionally, work in the ring $R'=\mathbb{Z}[X_1, X_2, \ldots X_n]$. Let $a \in R'$. Optionally, call its coefficients $a_i$, $i \in I$. Let b be another element of R' with coefficients $b_i$, $i \in I$. Optionally, call c their product modulo p: c=(a·b)mod p, and its coefficients $c_i$, $i \in I$. For each coefficient, it follows:

$$c_I = \sum_{J \in I} a_J b_{(I_1-J_1) \bmod N_1, (I_2-J_2) \bmod N_2, \ldots, (I_n-J_n) \bmod N_n} \bmod p.$$

The multinomial b is the inverse of a modulo p if $c_i=0$ for $i \neq 0$ and $c_0=1$. Finding it is equivalent to solving a system of $N_1 N_2 \cdots N_n$ linear equations modulo p. Since p is a prime number, $\mathbb{Z}_p$ is a field and Gaussian elimination can be used to determine if a is invertible and, if yes, to compute its inverse. This can be extended to the case where p is not a prime by a suitable modification of the Gaussian reduction algorithm, as shown in the example Python code as follows:

```python
def Gaussian_elimination(m_, p):
    '''
    Compute the inverse of m modulo p using Gaussian elimination, return None if
    m is not invertible.
    Arguments:
        m_: square 2D array of integers
        p: positive integer
    Return: matrix of integers or None
    '''
    # copy the input matrix
    m = m_.copy()
    # size of the matrix
    size = m_.shape[0]
    # dictionary of inverses modulo p
    inverses = inverse_mod_p(p)
    # matrix which will contain the result
    res = identity(size, dtype=int)
    # Step 1: eliminate the lower-left triangle
    for i in range(size):
        # look for a row having an ith coefficient invertible modulo p
        line = None
        coeffs = [ ]
        for j in range(i, size):
            if m[j,i] in inverses:
                line = j
                break
            coeffs.append(m[j,i])
        # if none has, see if we can make one by taking linear combinations of
        # the lines
        if line is None:
            coeffs = asarray(coeffs)
            while True:
                if 0 in coeffs:
                    return None
                imax = coeffs.argmax()
                imin = coeffs.argmin()
```

-continued

```
        quotient = coeffs[imax] // coeffs[imin]
        coeffs[imax] -= quotient * coeffs[imin]
        m[imax] -= quotient * m[imin]
        res[imax] -= quotient * res[imin]
        if coeffs[imax] in inverses:
            line = i + imax
            break
    # exchange the lines
    temp_m = m[i].copy( )
    temp_res = res[i].copy( )
    m[i] = m[line]
    res[i] = res[line]
    m[line] = temp_m
    res[line] = temp_res
    # divide the ith line by its ith coefficient
    inverse_mii = inverses[m[i][i] % p]
    res[i] = (res[i]*inverse_mii) % p
    m[i] = (m[i]*inverse_mii) % p
    # eliminate the ith coefficient from all lines below
    for j in range(i+ 1, size):
        res[j] = (res[j] − m[j][i] * res[i]) % p
        m[j] = (m[j] − m[j][i] * m[i]) % p
# Step 2: eliminate the upper-right triangle
for i in range(size−1):
    for j in range(size−i−1):
        res[j] = (res[j] − m[j,size−i−1] * res[size−i−1]) % p
        m[j] = (m[j] − m[j,size−i−1] * m[size−i−1]) % p
return res
```

A.4 NTRUEncrypt and Short Vector Problem (SVP)
A.4.1 Finding the Private Key Implies Solving a SVP This embodiment sketches how finding the private key of the NTRUEncrypt scheme can be related to a Short Vector Problem (SVP). Optionally, the notations of section 2.1. are used. Denote by $h_0, h_1, \ldots, h_{N-1}$ the coefficients of h, so that.

Optionally, define the square matrix H of size N by:

$$h(X) = \sum_{i=0}^{N-1} h_i X^i$$

$$\forall (i, j) \in [[1, N]]^2, H_{i,j} = h_{(i-j) \bmod N},$$

i.e., $$H = \begin{pmatrix} h_0 & h_{N-1} & h_{N-2} & \cdots & h_{N-1} \\ h_1 & h_0 & h_{N-1} & \cdots & h_{N-2} \\ \vdots & \vdots & \vdots & \ddots & \vdots \\ h_{N-1} & h_{N-2} & h_{N-3} & \cdots & h_0 \end{pmatrix}.$$

For any vector V of size N, HV is the vector of the coefficients of the polynomial h·v, where $$v \equiv \sum_{i=0}^{N-1} V_i X^i.$$

Let $I_N$ be the identity matrix in dimension N and $0_N$ the null matrix. The matrix $B_h$ is defined by $$B_h \equiv \begin{bmatrix} I_N & 0_N \\ H & qI_N \end{bmatrix}.$$

Optionally, call $f_0, f_1, \ldots, f_{N-1}$ the coefficients of f. and $g_0, g_1, \ldots, g_{N-1}$ those of g. Since f·h=(pg)mod q, one can find integer coefficients $a_0, a_1, \ldots, a_{N-1}$ such that $$B_h \begin{pmatrix} f_0 \\ f_1 \\ \vdots \\ f_{N-1} \\ a_0 \\ a_1 \\ \vdots \\ a_{N-1} \end{pmatrix} = \begin{pmatrix} f_0 \\ f_1 \\ \vdots \\ f_{N-1} \\ pg_0 \\ pg_1 \\ \vdots \\ pg_{N-1} \end{pmatrix}.$$

(Simply choose the as to be opposite of the coefficients of f·h−pg divided by q.) So, the vector made of the coefficients of f and p times those of g is a vector in the lattice $\mathcal{L}(B_h)$ generated by the columns of $B_h$. If these coefficients are small enough, this is a small vector in the lattice.

Optionally, assume there exists an algorithm to find f in time t from the knowledge of h and q. This algorithm could be used to find pg (equal to (f·h)mod q), and thus a short vector in the lattice $\mathcal{L}(B_h)$ after performing a number of operations polynomial in N. Finding the secret key of NTRUEncrypt for a given distribution of polynomials f and g is thus at least as hard (up to some polynomial overhead) as finding a 'short' (in a sense which depends on the constraints on f and g) vector in the corresponding lattices.

Similarly, recovering the message m from the encrypted e can be mapped to a Close Vector Problem. Indeed, denoting with an italic letter the sequence of the coefficients of the polynomial denoted by the corresponding bold-face letter, it follows:

$$E \equiv \begin{pmatrix} 0 \\ 0 \\ \vdots \\ 0 \\ e_0 \\ e_1 \\ \vdots \\ e_{N-1} \end{pmatrix} = B_h \begin{pmatrix} r_0 \\ r_1 \\ \vdots \\ r_{N-1} \\ 0 \\ 0 \\ \vdots \\ 0 \end{pmatrix} + \begin{pmatrix} -r_0 \\ -r_1 \\ \vdots \\ -r_{N-1} \\ m_0 \\ m_1 \\ \vdots \\ m_{N-1} \end{pmatrix}.$$

From the knowledge of m, one can get r in polynomial time, and thus a vector £ (Bh) close to E.

A.4.2 How 'Random' is the Lattice?

The SVP is conjectured to be hard for both classical and quantum computers over random lattices. The lattice generated by the matrix $B_h$ above is, however, not random due to its block form and the circulant nature of the matrix H. In order for the reduction to a SVP to be a convincing security argument, it is crucial that the lattice structure should not make it easy to find short vectors.

First, it is trivial to find vectors of length q. Denoting by $\|\cdot\|_2$ the $L^2$ norm (i.e., for a polynomial, the square root of the sum of its squared coefficients), the vector giving the private key has a length smaller than q if and only if $$\|f\|_2^2 + p^2\|g\|_2^2 < q^2.$$

On the other hand, the norms of these polynomials must not be too small. To see this, optionally follow the argument given in section 3.6.1 of reference [6]. Optionally, generalize the matrix B by adding a positive parameters and define $$B_h(\alpha) \equiv \begin{bmatrix} \alpha I_N & 0_N \\ H & qI_N \end{bmatrix}.$$

It follows:

$$B_h \begin{pmatrix} f_0 \\ f_1 \\ \vdots \\ f_{N-1} \\ a_0 \\ a_1 \\ \vdots \\ a_{N-1} \end{pmatrix} = \begin{pmatrix} \alpha f_0 \\ \alpha f_1 \\ \vdots \\ \alpha f_{N-1} \\ pg_0 \\ pg_1 \\ \vdots \\ pg_{N-1} \end{pmatrix},$$

so that the private key can be recovered by looking for short vectors in $\mathcal{L}(B_h(a))$. The $L^2$ norm of this vector is $$c(\alpha) = \sqrt{\frac{\pi e(\alpha\|f\|_2^2 + \alpha^{-1}p^2\|g\|_2^2)}{Nq}}.$$

For a random lattice of dimension n generated by a matrix of determinant D, the smallest vector is typically expected to have a length slightly larger than $D^{1/n}\sqrt{n/(2\pi e)}$, where e is Euler's constant [6]. In our case, n=2N and $D=a^N q^N$. So, the shortest vector is expected to be typically slightly larger than $\sqrt{aNq/(\pi e)}$. Let c(a) be the ratio of the length of the above vector to this quantity. It follows:

$$c_{min} = \sqrt{\frac{2\pi ep\|f\|_2\|g\|_2}{Nq}}.$$

An attacker may find this vector faster than would be possible for a typical random lattice if c(a) is significantly smaller than 1.

The minimum value $c_{min}$ of c(a) is obtained for $a = p\|g\|_2/\|f\|_2$.

$$p\|f\|_2\|g\|_2 \gtrsim \frac{Nq}{2\pi e}.$$

It is larger than or close to 1 provided $$p\|f\|_2\|g\|_2 \gtrsim \frac{Nq}{2\pi e}.$$

This is compatible with the previous condition provided $$N \lesssim \pi eq.$$

A.4.3 Extension to Higher Dimensions

The main idea of the argument given in section A.5.1 is to relate polynomial multiplication in R to matrix multiplication. This can be extended to multinomials using more general tensors Instead of matrices.

To see this, optionally choose $$L \in \mathbb{N}*, (N_1, N_2, \ldots, N_L) \in \mathbb{N}*^L,$$

and define the ring:

$$R' \equiv \mathbb{Z}[X_1, X_2, \ldots X_L]/\langle X_1^{N_1} - 1, X_2^{N_2} - 1, \ldots, X_L^{N_L} - 1 \rangle.$$

Let a be an element of R. Optionally, define the tensor A of the coefficients of a. (optionally make the indices of tensors start from 0 to simplify the notations.) Let h be a multinomial in R. Optionally, call h the sequence of its coefficients and H the corresponding tensor such that, for each possible value of $(i_1, i_2 \ldots i_1, j_1, j_2, \ldots, j_L)$ $$H_{i_1, i_2, \ldots, i_L, j_1, j_2, \ldots, j_L} = h_{(i_1-j_1) \bmod N_1, (i_2-j_2) \bmod N_2, \ldots, (i_L-j_L) \bmod N_L}.$$

Then, the coefficients of the product h·a are those of the tensor HA, defined by:

$$\forall I \in \prod_{l=1}^{L} [\![0, N_l]\!], (HA)_I = \sum_{J \in \prod_{l=1}^{L}[\![0,N_l]\!]} H_{I,J} A_J.$$

Optionally also define the unit tensor I of the same shape as H, defined by:

$$\forall (I, J) \in \left(\prod_{l=1}^{L} [\![0, N_l]\!]\right)^2, I_{I,J} = \begin{cases} 1 & \text{if } J = I \\ 0 & \text{otherwise} \end{cases}.$$

Optionally, work in the space of real tensors of shape $(N_1, N_2, \ldots, N_L, 2)$, with indices starting from 0. Linear transformations in this space can be represented by real tensors of shape $(N_1, N_2, N_L, 2, N_1, N_2, \ldots, N_L, 2)$, in the following way:

if $\mathcal{A}$ is such a tensor, and $\mathcal{Y}$ a tensor of size $(N_1, N_2, \ldots, N_L, 2)$, their product is the tensor $\mathcal{Y}$ of size $(N_1, N_2, \ldots, N_L, 2)$ given by:

$$\forall I \in \left[\prod_{l=1}^{L} [\![0, N_l]\!]\right] \times \{0, 1\}, y_I = \sum_{J \in [\prod_{l=1}^{L}[\![0,N_l]\!]] \times \{0,1\}} \mathcal{A}_{I,J} \mathcal{X}_J.$$

Optionally, define the tensor B in the following way: for each $(I, J) \in (\Pi_{l=1}^{L}[[0, N_1]])^2$.

$B_{I,0,J,0}=I_{I,J}$,
$B_{I,0,J,1}=0$,
$B_{I,1,J,0}=H_{I,J}$,
$B_{I,1,J,1}=qI_{I,J}$,

Let f and a be two elements of R'. We denote by y the product h·f and by f, a, and y the sequences of their coefficients. Optionally, define the tensor $\mathcal{Y}$ of shape ($N_1$, $N_2$, $N_L$, 2) by: for each $\mathcal{X}_{I,0}=f_I$ is the coefficient of $X^{I_1}X^{I_2} \ldots X^{I_L}$ in f,
$\mathcal{X}_{I,1}=a_I$ is the coefficient of $X^{I_1}X^{I_2} \ldots X^{I_L}$ in a.

Then, $B\mathcal{X}$ is the tensor $\mathcal{Y}$ of shape ($N_1, N_2, \ldots, N_L$, 2) defined by:

$$I \in \prod_{l=1}^{L}[0, N_l],$$

for $\mathcal{Y}_{I,0}=f_I$;
$\mathcal{Y}_{I,1}=y_I+qa_I$.

One can map any tensor of $\mathcal{A}$ shape ($N_1, N_2, \ldots, N_L$, 2, $N_1, N_2, N_L$, 2) to a square matrix B. of size $2 N_1 N_2 \ldots N_L$ and any vector X of size ($N_1, N_2, \ldots, N_L$, 2) to a vector of the same size by turning a multi-index I to a single index given by $$I_{L+1}\prod_{l=1}^{L}N_L + \sum_{l=1}^{L}I_l \prod_{1 \leq k < i}N_k.$$

Optionally, call M this mapping. Using the above notations, it follows that:

$M(y)M(\mathcal{Y})=M(B\mathcal{Y})=M(\mathcal{Y})$.

So, since the two polynomials (and thus the tensor $\mathcal{Y}$, and thus $M(\mathcal{Y})$) have integer coefficients, M(y) is an element of the lattice $\mathcal{L}(M(y))$ generated by M (B).

Finding a short tensor y which can be constructed from two elements of R, f and a, allows/gives a short vector in $\mathcal{L}(M(y))$ The argument then proceeds as for the case of polynomials: assuming an algorithm exists to find the secret key f of NTRU2D from the knowledge of the public key h and of q, one could then compute pg=(f·h)mod q and, by suitably choosing the coefficients $a_I$ so that no $y_{I,1}$ is larger than $\lfloor q/2 \rfloor$ in absolute value, and assuming the $L^2$ norms of f and pg are sufficiently small, a short vector M(y) in $\mathcal{L}(M(y))$ with an overhead at most polynomial in N.

Similarly, recovering a message m from the ciphertext e can be mapped to a close vector problem. To see this, consider the tensors $\mathcal{Y}$, y, and $\mathcal{Z}$ with the same shape as $\mathcal{Y}$ above and coefficients given by, for each value of I:

$\mathcal{Y}_{I,0}=r_I$,
$\mathcal{Y}_{I,1}=0$,
$y_{I,0}=0$,
$y_{I,0}=e_I$,
$\mathcal{Z}_{I,0}=-r_I$.
$\mathcal{Z}_{I,1}=m_I$.

It follows:

$y = y\mathcal{Y}+\mathcal{Z}$.

So, since the mapping M is linear and preserves multiplication, $M(y)=M(y)M(\mathcal{Y})+M(\mathcal{Z})$.

Given e, from the knowledge of m, one can recover r in polynomial time in N. One can thus, also in polynomial time, get a vector which, if r and m are sufficiently small, is a vector of $\mathcal{L}(M(y))$ close to M(y).

B Practical Considerations

B.1 Multinomial Multiplication and Finite Accuracy

One possible difficulty for the optical implementation of NTRU2D is that coefficients of the product of two multinomials with high degrees can be significantly larger than those of each factor, which can be a problem on low-accuracy devices where the output can take a limited number of different values. We here show two techniques which can be used to mitigate the problem. They both rely on writing each factor as a sum of two multinomials and their product as a sum of products of 'smaller' ones. These rewritings can be done in succession several times until the two factors in each term are small enough to be dealt with by the device one wishes to implement multiplication on. The results can then be combined by a higher-accuracy device using bit- or register-shifting and additions B.1.1 Reducing the Coefficients Amplitudes Let $n \in \mathbb{N}^*$, $q \in \mathbb{N} \setminus \{0, 1\}$ and let R be either $R_0 \equiv \mathbb{Z}_q[X_1, X_2, \ldots X_n]$ or $R_0/<M_1, M_2, \ldots, M_L>$ where $L \in \mathbb{N}+$ and $M_1, M_2, \ldots M_L \in R_0$.

Denote by · the multiplication in R. All operations are done modulo q.

Let $(a, b) \in R^2$. Let $l \in \mathbb{N}^*$.

Optionally assume that the coefficients of a and b are (2l)-bits integers. One can then find four multinomials $a_1$, $a_2$, $b_1$, and $b_2$ whose coefficients are/bits integers such that $a=2^l a_1+a_2$ and $b=2^l b_1+b_2$.

(One can take the coefficients of $a_1$ (respectively $b_1$) to be the integers given by the/highest bits of those of a (respectively b) and those of $a_2$ (respectively $b_2$) to be the integers given by the/lowest bits of those of a (respectively b).)

Consequently:

$a \cdot b = 2^{2l}a_1 \cdot b_1+2^l[a_1 \cdot b_2+a_2 \cdot b_1]+a_2 \cdot b_2$.

The product of a and b can thus be computed in the following way:

1. Compute the four products $a_i \cdot b_j$ for $(i,j) \in \{1, 2\}^2$.
2. Perform bit-shifts by 2l and l to compute $2^{2l}a_1 \cdot b_1$, $2^l a_1 \cdot b_2$, and $2^l a_2 \cdot b_1$.
3. Sum the results.

Repeating above procedures n times, the total number of multinomial multiplications is $4^n$, and the number of bits needed to write each coefficient of the multinomials a and b is divided by $2^n$.

The number of multiplication needed at each step can be reduced to 3 by noting that:

$a_1 \cdot b_2+a_2 \cdot b_1=(a_1-a_2) \cdot (b_2-b_1)+a_1 \cdot b_1+a_2 \cdot b_2$.

However, one bit then needs to be reserved for the sign of each coefficient.

B.1.2 Reducing the Degree

A similar technique can be used to reduce the degrees of the multinomials. Unless explicitly stated, optionally use the same notations as above. Let k be an integer between 1 and n, and l a positive integer. We assume that the largest power of $X_k$ in a and b is no larger than 2l. We can then choose four multinomials $a_1$, $a_2$, $b_1$, and $b_2$ with a highest power in $X_k$ no larger than 1 and such that $X_k^l a_1 + a_2 = a$ and $X_k^l b_1 + b_2 = b$. Then, $$a \cdot b = X_k^{2l} a_1 \cdot b_1 + X_k^l [(a_1 - a_2) \cdot (b_2 - b_1) + a_1 \cdot b_1 + a_2 \cdot b_2] + a_2 \cdot b_2.$$

The product of a and b can thus be computed by performing 3 multinomial multiplications ($a_1 \cdot b_1$, $a_2 \cdot b_2$, and $(a_1-a_2) \cdot (b_2-b_1)$). This procedure can be iterated to reduce, possibly several times, the maximum power of several or all variables.

Figure 6:
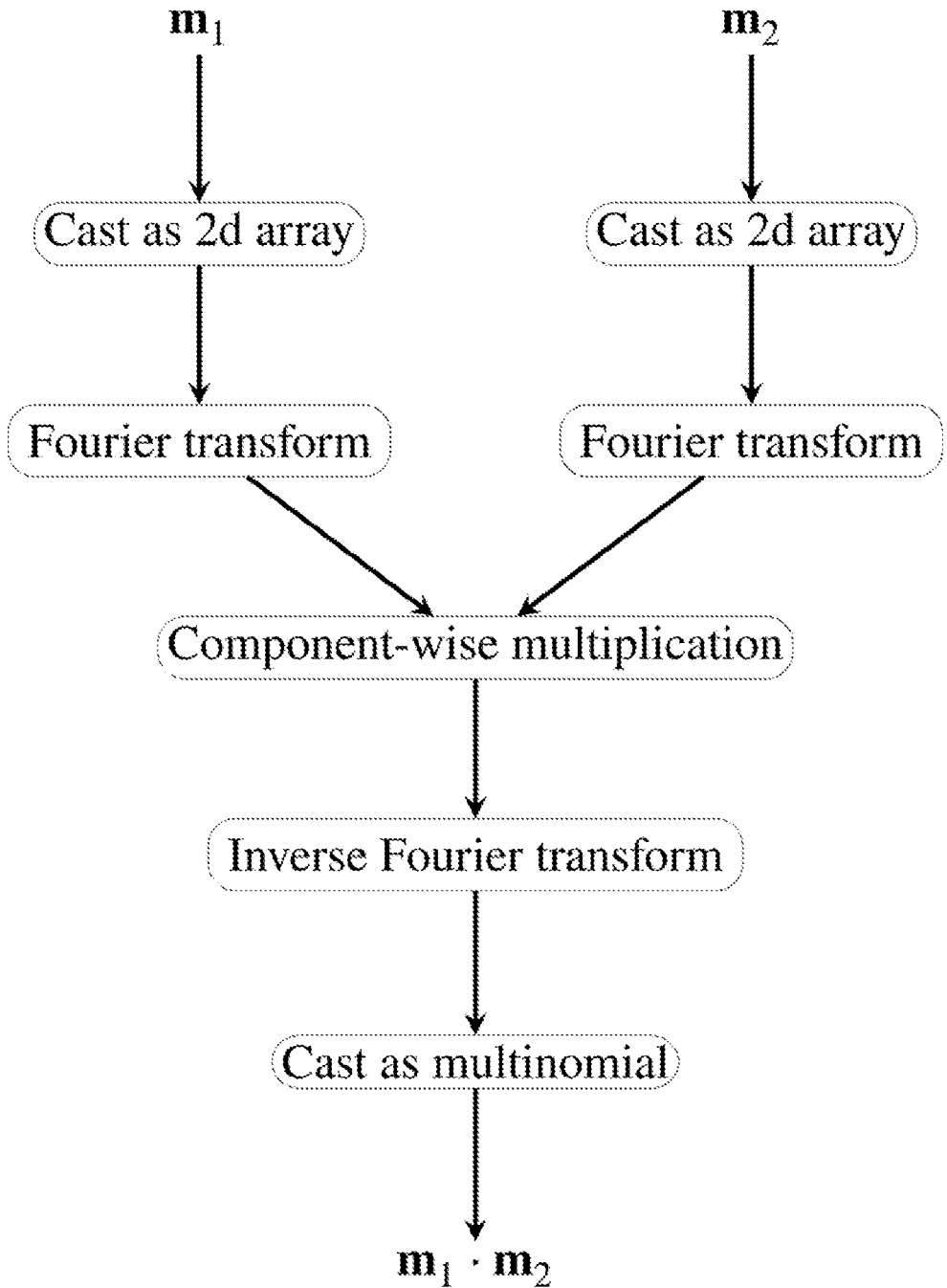
FIG. 6 shows a flow diagram of multinomial multiplication.
Figure 7:
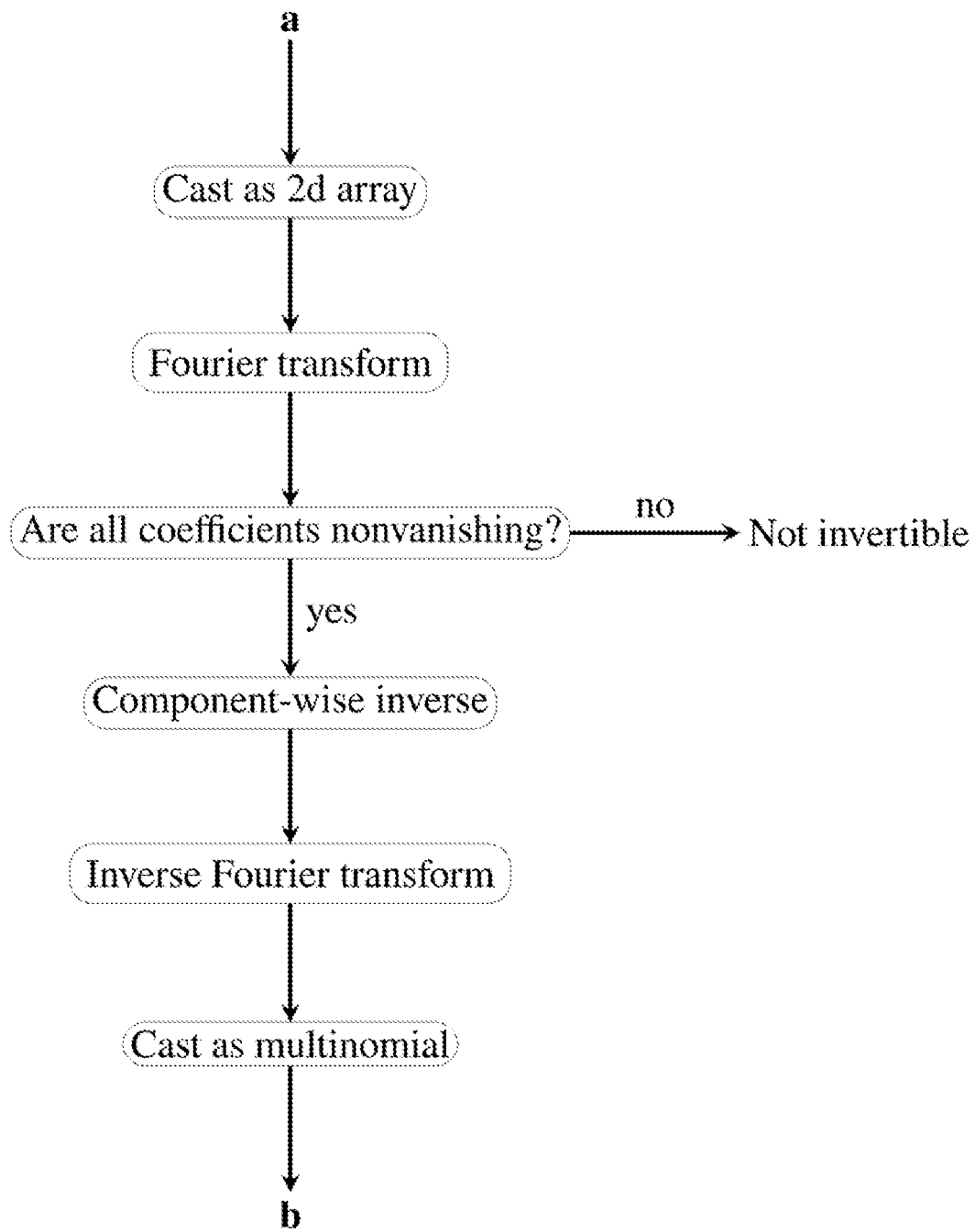
FIG. 7 shows a flow diagram of an optical process.

B.2 Block 2D Discrete Fourier Transform—FIGS. 6 and 7

FIG. 8 is a flow chart of a multinomial multiplication using a Fourier transform and its inverse (multinomial multiplication using 2D Fourier transform). The Fourier transform and inverse Fourier transform operations can be advantageously performed on an optical chip in a fast manner, at low power. FIG. 7 is a flow chart of the multinomial inversion using a Fourier transform and its inverse. If a is invertible, the algorithm returns its inverse b.

The optical implementation may be realized on any one or a combination of the prior art optical systems which are embodied in any of the following patent applications which are owned by Optalysys Limited:

EP1420322;
WO2018167316;
EP1546838;
U.S. Pat. No. 10,289,151;
U.S. Pat. No. 10,409,084;
WO2019207317;
PCT/EP2020/065740.

Each one of these documents is incorporated by reference. The prior art system architectures would be configured to operate the method of various embodiments of the invention.

It will be appreciated that it is possible to extend the same algorithms to higher dimensions replacing the 2D arrays by higher-dimensional ones. Different rings of multinomials are also envisaged.

We now describe how to perform a block decomposition for the discrete 2D Fourier transform. One advantage of such a decomposition is to reduce the maximum modulus of the Fourier coefficients of each block, thus potentially improving the accuracy. A typical workflow can be:

1. Perform the Fourier transform on each block using a fast but low-accuracy device.
2. Combine the results to compute the full Fourier transform on a slower, high-accuracy device.

For consistency with the notations of the rest of the document, the values of matrix indices start at 0.

Let $N_1$ and $N_2$ be two integers and let A be a matrix of integers with size $(N_1, N_2)$. We define the Fourier transform $\tilde{A}$ of A as the complex matrix with the same shape with coefficients given by:

$$\forall (u, v) \in [\![0, N_1 - 1]\!] \times [\![0, N_2 - 1]\!],$$

$$\tilde{A}_{u,v} = \sum_{i=0}^{N_1-1} \sum_{j=0}^{N_2-1} \exp\left[2i\pi\left(\frac{ui}{N_1} + \frac{vj}{N_2}\right)\right] A_{i,j}.$$

Let $n_1$ be a divisor of $N_1$ and $n_2$ a divisor of $N_2$. Optionally define $q_1 \equiv N_1/n_1$ and $q_2 \equiv N_2/n_2$.

Optionally, define the matrices $A^{(i,j)}$ of size $(q_1, q_2)$ for $(i;j)$ in $[\![0, n_1-1]\!] \times [\![0, n_2-1]\!]$ by:

$$\forall (u, v) \in [\![0, N_1 - 1]\!] \times [\![0, N_2 - 1]\!],$$

$$\tilde{A}_{u,v} = \sum_{i=0}^{N_1-1} \sum_{j=0}^{N_2-1} \exp\left[2i\pi\left(\frac{ui}{N_1} + \frac{vj}{N_2}\right)\right] A_{i,j}.$$

Optionally also define their Fourier transforms $\tilde{A}^{(i,j)}$ in the following way: For each couple of integers $(i, j)$ where I is between 0 and $n_1-1$ and j is between 0 and $n_2-1$, is the complex matrix $\tilde{A}^{(i,j)}$ of size $(q_1; q_2)$ given by:

$$\forall (U, V) \in [\![0, q_1 - 1]\!] \times [\![0, q_2 - 1]\!],$$

$$\tilde{A}^{(i,j)}_{U,V} = \sum_{I=0}^{q_1-1} \sum_{J=0}^{q_2-1} \exp\left[2i\pi\left(\frac{UI}{q_1} + \frac{VJ}{q_2}\right)\right] A^{(i,j)}_{I,J}.$$

Let $(u, v) \in [\![0, N_1-1]\!] \times [\![0, N_2-1]\!]$. We have:

$$\tilde{A}_{u,v} = \sum_{I=0}^{q_1-1} \sum_{J=0}^{q_2-1} \sum_{i=0}^{n_1-1} \sum_{j=0}^{n_2-1} \exp\left[2i\pi\left(\frac{uI}{q_1} + \frac{vJ}{q_2}\right)\right] \exp\left[2i\pi\left(\frac{ui}{N_1} + \frac{vj}{N_2}\right)\right] A^{(i,j)}_{I,J},$$

$$\tilde{A}_{u,v} = \sum_{i=0}^{n_1-1} \sum_{j=0}^{n_2-1} \exp\left[2i\pi\left(\frac{ui}{N_1} + \frac{vj}{N_2}\right)\right] \tilde{A}^{(i,j)}_{u \bmod q_1, v \bmod q_2}.$$

Once the discrete Fourier transforms of the 'blocks' $A^{(i,j)}$ are computed, the full Fourier transform can thus, be obtained after performing $N_1 N_2 n_1 n_2$ mm multiplications by a complex exponential ($n_1 n_2$ for each entry). To make this number small, it is desirable to keep $n_1$ and $n_2$ as low as possible.

The main interest of this procedure is that the Fourier coefficients of each 'block' are typically smaller than those of $\tilde{A}$. Indeed, if the absolute value of the coefficients of A is bounded from above by some positive number $a_{max}$, those of the Fourier transform of each block are bounded from above by $N_1 N_2 a/(n_1 n_2)$, versus $a N_1 N_2$ for those of $\tilde{A}$. A device which can reach an acceptable accuracy provided the coefficients have an absolute value no larger than some positive number ad will thus be able to compute the Fourier transform of each block provided $$n_1 n_2 \geq \frac{a}{a_d} N_1 N_2.$$

C. Computing a "Large" 2D Discrete Fourier Transform or a Batch of 1D Ones from "Small" 2D Transforms: Extending the Cooley-Tukey FFT Algorithm The Cooley-Tukey Fast Fourier Transform (FFT) is an algorithm used to compute a discrete Fourier transform with complexity 0 (N log N), where N is the number of entries. It is often used to compute one-dimensional Fourier transforms on electronic hardware where the fundamental operations are scalar additions and multiplications. This embodiment shows how to use it to accelerate the computation of the Fourier transforms of large images using an optical device of the kind referred to any previous section.

Before that, some notations are introduced:

Consider the two-dimensional discrete Fourier transform with shape $(N_x, N_y)$ for some positive integers $N_x$ and $N_y$. Two-dimensional arrays of real or complex numbers with the same shape will be denoted by bold capital Latin letters, and their coefficients with the non-bold version and two indices denoting their positions. The set of such arrays is denoted by $\mathcal{A}$.

Denote by FT the discrete two-dimensional Fourier transform, i.e., the function $\mathcal{A} \to \mathcal{A}$ defined by, for each array $A \in \mathcal{A}$ and each $(j, k) \in [\![1, N_x]\!] \times [\![1, N_y]\!]$:

$$FT(A)_{j,k} = \sum_{u=1}^{N_x}\sum_{v=1}^{N_y} \exp\left[2\pi i\left(\frac{(j-1)(u-1)}{N_x} + \frac{(k-1)(v-1)}{N_y}\right)\right] A_{u,v}.$$

Denote by $FT^{(1)}$ the discrete one-dimensional Fourier transform, i.e., the function $\mathcal{A} \to \mathcal{A}$ defined by, for each array $A \in \mathcal{A}$ and each $(j, k) \in [\![1, N_x]\!] \times [\![1, N_y]\!]$:

$$FT^{(1)}(A)_{j,k} = \sum_{u=1}^{N_x} \exp\left[2\pi i\left(\frac{(j-1)(u-1)}{N_x}\right)\right] A_{u,v}.$$

Assume the device of interest has a rectangular input array of pixels, with sides given by two positive integers $n_x$ and $n_y$. Two-dimensional arrays of real or complex numbers with the same shape will be denoted by bold lowercase letters. The set of such arrays is denoted by $\mathcal{A}'$.

Denote by OFT the optical Fourier transform. (It is a function from $\mathcal{A}'$ to itself.) For the sake of simplicity, assume OFT is an exact two-dimensional discrete Fourier transform defined by, for each array $a \in \mathcal{A}'$ and each $(j, k) \in [\![1, n_x]\!] \times [\![1, n_y]\!]$:

$$OFT(a)_{j,k} = \sum_{u=1}^{n_x}\sum_{v=1}^{n_y} \exp\left[2\pi i\left(\frac{(j-1)(u-1)}{n_x} + \frac{(k-1)(v-1)}{n_y}\right)\right] a_{u,v}.$$

Finally, assume that $N_x$ is a multiple of $n_x$ and that $N_y$ is a multiple of $n_y$. Define the ratios $$d_x = \frac{N_x}{n_x} \text{ and } d_y = \frac{N_y}{n_y}.$$

C.1 Smaller Fourier Transform

Notice that, if $m_x$, $l_x$, $m_y$, and $l_y$ are two positive integers such that $m_x l_x = n_x$ and $m_y l_y = n_y$, the function OFT can be used to compute a Fourier transform of shape $(m_x, m_y)$ as follows. Let b be a complex array with shape $(m_x, m_y)$. Define the array a with shape $(n_x, n_y)$ by, for each $(j, k) \in [\![1, n_x]\!] \times [\![1, n_y]\!]$, If $j-1 \equiv 0 \bmod l_x$ and $k-1 \equiv 0 \bmod l_y$, then $$a_{j,k} = b_{\frac{j-1}{l_x}+1, \frac{k-1}{l_y}+1}.$$

Otherwise, $a_{j,k}=0$.

Let $\tilde{b}$ be the array obtained from OFT(a) by restricting its first coefficient to $[\![1, m_x]\!]$ and the second one to $[\![1, m_y]\!]$. For each $(j, k) \in [\![1, m_x]\!] \times [\![1, m_y]\!]$, $$\tilde{b}_{j,k} = \sum_{u=1}^{m_x}\sum_{v=1}^{m_y} \exp\left[2\pi i\left(\frac{(j-1)(u-1)}{m_x} + \frac{(k-1)(v-1)}{m_y}\right)\right] b_{u,v}.$$

So, $\tilde{b}$ is the Fourier transform of b.

C.2 Larger Fourier Transform

The question dealt with here is: Given a device which can perform the function OFT, how can one reconstruct the function FT? An embodiment presents a solution in three steps: divide the input (which is an element of $\mathcal{A}$) into $d_x \times d_y$ elements of $\mathcal{A}'$, perform OFT on each of them, and recombine the results.

Let A be an element of $\mathcal{A}$. For each $(j,k) \in [\![1, d_x]\!] \times [\![1, d_y]\!]$, define the array $a^{(j,k)}$ of shape $(n_x, n_y)$ by: for each $$(u, v) \in [\![1, n_x]\!] \times [\![1, n_y]\!], a^{(j,k)}_{u,v} = A_{j+(u-1)d_x, k+(v-1)d_y}.$$

Assume the optical Fourier transform of each of these arrays is computed. Then, the Fourier transform of A can be computed as follows. Let $(j,k) \in [\![1, d_x]\!] \times [\![1, d_y]\!]$. Using the definition of the function FT and decomposing each integer between 1 and $N_x$ (respectively between 1 and $N_y$) in the right-hand side as a multiple of $d_x$ (respectively $d_y$) plus the remainder of the Euclidean division by $d_x$ (respectively $d_y$), it follows:

$$FT(A)_{j,k} \sum_{j'=1}^{d_x}\sum_{k'=1}^{d_y}\sum_{u'=1}^{n_x}\sum_{v'=1}^{n_y} \exp\left[2\pi i\left(\frac{(j-1)(j'+(u'-1)d_x-1)}{N_x} + \frac{(k-1)(k'+(v'-1)d_y-1)}{N_y}\right)\right] A_{j'+(u'-1)d_x, k'+(v'-1)d_y}.$$

This may be rewritten using the smaller arrays just defined as:

$$FT(A)_{j,k} \sum_{j'=1}^{d_x}\sum_{k'=1}^{d_y}\sum_{u'=1}^{n_x}\sum_{v'=1}^{n_y} \exp$$

$$\left[2\pi i\left(\frac{(j-1)(j'+(u'-1)d_x-1)}{N_x} + \frac{(k-1)(k'+(v'-1)d_y-1)}{N_y}\right)\right] a^{(j',k')}_{u',v'}.$$

Using that $\exp(c_1+c_2)=\exp(c_1)\exp(c_2)$ for any two complex numbers $c_1$ and $c_2$, this becomes:

$$FT(A)_{j,k} \sum_{j'=1}^{d_x}\sum_{k'=1}^{d_y} \exp\left[2\pi i\left(\frac{(j-1)(j'-1)}{N_x} + \frac{(k-1)(k'-1)}{N_y}\right)\right]$$

$$\sum_{u'=1}^{n_x}\sum_{v'=1}^{n_y} \exp\left[2\pi i\left(\frac{(j-1)(u'-1)}{n_x} + \frac{(k-1)(v'-1)}{n_y}\right)\right] a^{(j',k')}_{u',v'}.$$

Performing the last two sums is equivalent to computing the optical Fourier transform of the array $a^{(j',k')}$. So, $$FT(A)_{j,k} =$$

$$\sum_{j'=1}^{d_x}\sum_{k'=1}^{d_y} \exp\left[2\pi i\left(\frac{(j-1)(j'-1)}{N_x} + \frac{(k-1)(k'-1)}{N_y}\right)\right] OFT(a^{(j',k')})_{j,k}.$$

In this equation, the array indices are assumed to be periodic (with period equal to the size of the array in the corresponding direction) to (slightly) simplify the notations, i.e, the indices i and j of the right-most array should be taken modulo $n_x$ and $n_y$, respectively. To get the formula without the periodicity condition, simply replace $OFT(a^{(j',k')})_{j,k}$ by $$OFT(a^{(j',k')})_{j\%n_x,k\%n_y},$$

where % denotes the modulo operator such that, for two positive integers a and b, a % b is the remainder of the Euclidean division of a by b if this remainder is not 0, and b if this remainder is 0. (This slightly unusual definition is due to the fact that arrays are indexed from 1.)

This expression can be simplified in the following way. Define the two arrays $\Omega^{(x)}$ and $\Omega^{(y)}$ with respective shapes $N_x$ by $d_x$ and $N_y$ by $d_y$ by: for each $(j,j') \in [[1, N_x]] \times [[1, d_x]]$ and $(k, k') \in [[1, N_y]] \times [[1, d_y]]$, $$\Omega^{(x)}_{j,j'} = \exp\left[\frac{2i\pi}{N_x}(j-1)(j'-1)\right] \text{ and}$$

$$\Omega^{(y)}_{k,k'} = \exp\left[\frac{2i\pi}{N_y}(k-1)(k'-1)\right].$$

Then, re-introducing the modulo operator for completeness, $$FT(A)_{j,k} = \sum_{j'=1}^{d_x} \sum_{k'=1}^{d_y} \Omega^{(x)}_{j,j'} \Omega^{(y)}_{k,k'} OFT(a^{(j',k')})_{j\%n_x,k\%n_y}.$$

(Notice that this may be seen as performing $n_x n_y$ Fourier transforms with size $N_x$ by $N_y$, keeping only $d_x$ by $d_y$ arrays for the input and output.)

Estimate the complexity C of the calculation. Call $C_{OFT}$ the complexity of each OFT operation. There are $n_x n_y$ such operations and then $d_x d_y$ terms to sum for each coefficient. The complexity of the full calculation is thus $O((N_x N_y + C_{OFT})d_x d_y)$. In general, $C_{OFT}$ will be much smaller than $N_x N_y$ for large images. Asymptotically, the complexity thus becomes $O(N_x N_y d_x d_y)$. This is better than the naive Fourier transform approach (which has complexity $O(N_x^2 N_y^2)$) by a factor $n_x n_y$.

This result can be further improved by performing the decomposition iteratively several times. Indeed, there is nothing special about the use of the OFT function in the above calculation: we only used that it is a Fourier transform on a subset of the full array. Let us assume, for definiteness, that there exists a positive integer m such that $N_x = 2^m n_x$ and $N_y = 2^m n_y$. Then, the Fourier transform of A can be computed by first separating A into 4 sub-arrays (the number of required recombination operations to reconstruct the full result from their Fourier transforms will be $4N_x N_y$), then each sub-array in 4 smaller array (requiring again $4N_x N_y$ recombination operations), . . . . After m such subdivisions, perform the $2^{2m}$ optical Fourier transforms on each sub-array of shape $(n_x, n_y)$ and recombine the results using the above formula iteratively, with the function OFT replaced by the discrete Fourier transform of the small arrays. The total number of operations scales like $O(4mN_x N_y + 2^{2m} C_{OFT})$. It may be rewritten using the total number $N = N_x N_y$ of coefficients, in the limit where N and $n_x n_y$ are both large, as $$C = O\left(N\log_2\left(\frac{N}{n_x n_y}\right) + \frac{N}{n_x n_y} C_{OFT}\right).$$

Assuming $C_{OFT}$ is at most linear in $n_x n_y$, this gives $$C = O\left(N\log_2\left(\frac{N}{n_x n_y}\right)\right),$$

which is better than the complexity $O(N \log_2 N)$ of the Cooley-Tukey approach for large values of $n_x n_y$.

C.3 Re-Formulation in Terms of a Second Fourier Transform

Define, for each $(j, k) \in [[1, n_x]] \times [[1, n_y]]$, the array $\overline{a}^{(j,k)}$ with shape $(d_x, d_y)$ by:

$$\forall (j', k') \in [[1, d_x]] \times [[1, d_y]], \overline{a}^{(j,k)}_{j',k'} = \Omega^{(x)}_{j,j'} \Omega^{(y)}_{k,k'} OFT(a^{(j',k')})_{j,k}.$$

Then, the above equation becomes:

$$FT(A)_{j,k} =$$

$$\sum_{j'=1}^{d_x}\sum_{k'=1}^{d_y} \exp\left[\frac{2i\pi}{d_x}\left(\frac{j-1}{n_x}\right)(j'-1)\right]\exp\left[\frac{2i\pi}{d_y}\left(\frac{k-1}{n_y}\right)(k'-1)\right]\overline{a}^{(j\%n_x,k\%n_y)}_{(j',k')},$$

where $=$ denotes the Euclidean division. For each element $(q_x, q_y, r_x, r_y)$ of $[[0, d_x-1]] \times [[0, d_y-1]] \times [[1, n_x]] \times [[1, n_y]]$, we have:

$$FT(A)_{q_x n_x + r_x, q_y n_y + r_y} =$$

$$\sum_{j'=1}^{d_x}\sum_{k'=1}^{d_y} \exp\left[\frac{2i\pi}{d_x} q_x(j'-1)\right]\exp\left[\frac{2i\pi}{d_y} q_y(k'-1)\right]\overline{a}^{(r_x,r_y)}_{j',k'}.$$

The array FT(A) can thus be computed by performing $n_x n_y$ Fourier transforms with shape $(d_x, d_y)$ as follows. For each $(r_x, r_y) \in [[1, n_x]] \times [[1, n_y]]$, define the array $\overline{A}^{(r_x,r_y)}$ with shape $(d_x, d_y)$ by:

$$\forall (s_x, s_y) \in [[1, d_x]] \times [[1, d_y]],$$

$$\overline{A}^{(r_x,r_y)}_{s_x,s_y} = \sum_{j'=1}^{d_x}\sum_{k'=1}^{d_y} \exp\left[\frac{2i\pi}{d_x}(s_x-1)(j'-1)\right]\exp\left[\frac{2i\pi}{d_y}(s_y-1)(k'-1)\right]\overline{a}^{(r_x,r_y)}_{j',k'}.$$

The array $\overline{A}^{(r_x,r_y)}$ is simply the Fourier transform of $\overline{a}^{(r_x,r_y)}$. Then, for each $(j, k) \in [[1, N_x]] \times [[1, N_y]]$, we have:

$$FT(A)_{j,k} = \overline{A}^{(j\%n_x,k\%n_y)}_{\frac{j-1}{n_x}+1,\frac{k-1}{n_y}+1}.$$

All in all, computing the Fourier transform of A can, in a preferred embodiment, thus be performed in three steps:
one involving $d_x d_y$ Fourier transforms with shape $(n_x, n_y)$,
multiplication of the result by some complex numbers with unit modulus,
one involving $n_x n_y$ Fourier transforms with shape $(d_x, d_y)$.

If there exist a positive integer a such that $$N_x = n_x^\alpha \text{ and } N_y = n_y^\alpha,$$

this procedure can be iterated to perform the full Fourier transform using the OFT function as a building-block. This function will then be called $$\alpha n_x^{\alpha-1} n_y^{\alpha-1}$$

times in total, and the procedures involves $(\alpha-1)N_xN_y$ multiplications by a complex exponential. If $C_{OFT}$ denotes the complexity of the OFT function and $C_x$ that of the multiplication by a complex exponential, the total complexity C is thus $$C \approx \frac{N_xN_y}{n_xn_y}\frac{\log(N_xN_y)}{\log(n_xn_y)}C_{OFT} + N_xN_y\left(\frac{\log(N_xN_y)}{\log(n_xn_y)} - 1\right)C_x.$$

(The $\approx$ symbol is used because some re-ordering of coefficients or matrix transpositions may be required depending on the implementation.) For large values of $\alpha$, this may be simplified as:

$$C \approx N_xN_y\frac{\log(N_xN_y)}{\log(n_xn_y)}\left(\frac{C_{OFT}}{n_xn_y} + C_x\right).$$

C.4 One-Dimensional Fourier Transforms

Using the above equation $$FT(A)_{j,k} = \sum_{j'=1}^{d_x}\sum_{k'=1}^{d_y}\exp\left[2\pi i\left(\frac{(j-1)(j'-1)}{N_x} + \frac{(k-1)(k'-k)}{N_y}\right)\right]OFT(a^{(j',k')})_{j\% n_x, k\% n_y}.$$

and performing the inverse Fourier transform gives, denoting by $FT^{(1)}$ the one-dimensional Fourier transform along the first axis:

$$FT^{(1)}(A)_{j,k} = \frac{1}{N_y}\sum_{k''=1}^{N_y}\sum_{j'=1}^{d_x}\sum_{k'=1}^{d_y}$$
$$\exp\left[2\pi i\left(\frac{(j-1)(j'-1)}{N_x} + \frac{(k''-1)(k'-k)}{N_y}\right)\right]OFT(a^{(j',k')})_{j\% n_x, k''\% n_y}.$$

This may be rewritten as:

$$FT^{(1)}(A)_{j,k} = \frac{1}{N_y}$$
$$\sum_{k''=1}^{n_y}\sum_{k'''=1}^{d_y}\sum_{j'=1}^{d_x}\sum_{k'=1}^{d_y}\exp\left[2\pi i\left(\frac{(j-1)(j'-1)}{N_x} + \frac{(k''+(k'''-1)n_y-1)(k'-k)}{N_y}\right)\right]$$
$$OFT(a^{(j',k')})_{j\% n_x, k''}.$$

Summing over k''' (noting that the sum gives 0 unless $k'-k \equiv 0 \cdot [d_y]$ since $N_y = n_y d_y$) gives:

$$FT^{(1)}(A)_{j,k} = \frac{1}{n_y}\sum_{k''=1}^{n_y}\sum_{j'=1}^{d_x}\exp\left[2\pi i\left(\frac{(j-1)(j'-1)}{N_x} + \frac{(k''-1)\left(\frac{k-1}{d_y}\right)}{n_y}\right)\right]$$
$$OFT(a^{(j', k\% d_y)})_{j\% n_x, k''}.$$

Define, for each $(j, k) \in [[1, n_x]] \times [[1, d_y]]$, the array $\overline{a}^{(j,k)}$ with shape $(d_x, n_y)$ by:

$$\forall (j', k') \in [[1, d_x]] \times [[1, d_y]],$$
$$\overline{a}^{(j,k)}_{j',k'} = \exp\left[2\pi i\frac{(j-1)(j'-1)}{N_x}\right]OFT(a^{(j',k)})_{j,(((n_y-k'+1)\%_0 n_y)+1)},$$

where $\%_0$ denotes the standard modulo operator, I.e., If n and m are two Integers, $n\%_0 m$ is the positive integer between 0 and $m-1$ (included) such that $n-(n\%_0 m)$ divides m.

Then, the above equation becomes:

$$FT^{(1)}(A)_{j,k} =$$
$$\frac{1}{n_y}\sum_{k'=1}^{n_y}\sum_{j'=1}^{d_x}\exp\left[2\pi i\left(\frac{\frac{j-1}{n_x}(j'-1)}{d_x} + \frac{(k'-1)\frac{k-1}{d_y}}{n_y}\right)\right]\overline{a}^{(j\% n_x, k\% d_y)}_{j',k'}.$$

Let us call, for each $(j, k) \in [[1, n_x]] \times [[1, d_y]]$, the array $\overline{A}^{(j,k)}$ as the Fourier transform of $\overline{a}^{(j,k)}$. Then, the above equation becomes:

$$FT^{(1)}(A)_{j,k} = \frac{1}{n_y}\overline{A}^{(j\% n_x, k\% d_y)}_{\frac{j-1}{n_x}+1, \frac{k-1}{d_y}+1}.$$

This gives a way to perform $N_y$ batched one-dimensional Fourier transforms of size $N_x$ from two-dimensional ones.

In particular, choosing $N_y = n_y$ (and thus $d_y = 1$) and $$N_x = n_x^2$$

(and thus $d_x = n_x$), this procedures allows to compute $n_y$ 1D Fourier transforms with size $n_x^2$ by performing $$n_x^2 n_y$$

memory accesses,
$n_x$ 2D Fourier transforms with shape $(n_x, n_y)$, $$n_x^2 n_y$$

complex multiplications and memory accesses,
$n_x$ 2D Fourier transforms with shape $(n_x, n_y)$, $$n_x^2 n_y$$

memory accesses.

In total, this algorithm requires $$3n_x^2 n_y$$

memory accesses, $$n_x^2 n_y$$

complex multiplications, and $2n_x$ 2D Fourier transforms with shape $(n_x, n_y)$ to compute $n_y$ 1D Fourier transforms with size $$n_x^2.$$

C.5 Higher-Dimensional Fourier Transforms

One- and two-dimensional Fourier transforms can be combined to produce higher-dimensional ones. For any positive integer D, the (D-dimensional) Fourier transform of a D-dimensional array A can be computed, for instance,
- by performing one-dimensional Fourier transforms along each of the dimensions.
- or by performing two-dimensional Fourier transforms in $$\left\lfloor \frac{D}{2} \right\rfloor$$

planes with no common non-vanishing vector and, If D is odd, one-dimensional ones in the last direction.

For instance, the three-dimensional Fourier transform of an array with shape $(N_x, N_y, N_z)$ can be performed by doing $N_z$ two-dimensional Fourier transforms with shape $(N_x, N_y)$ followed by $N_x N_y$ one-dimensional Fourier transforms with size $N_z$.

REFERENCES

[1] Jeffrey Hoffstein, Jill Pipher, and Joseph H. Silverman. NTRU: A new high speed public key cryptosystem. 13 Aug. 1996. preliminary draft.
[2] Jeffrey Hoffstein, Jill Pipher, and Joseph H. Silverman. NTRU: A ring-based public key cryptosystem. In Joe P. Buhler, editor, *Algorithmic Number Theory*, pages 267-288, Berlin, Heidelberg, 1998. Springer Berlin Heidelberg.
[3] Damien Stehle and Ron Steinfeld. Making NTRUEncrypt and NTRUSign as Secure as Standard Worst-Case Problems over Ideal Lattices. Cryptology ePrint Archive, Report 2013/004, 2013. https://eprint.iacr.org/2013/004.
[4] Daniel Augot, Lejla Batina, Daniel J. Bernstein, Joppe Bos, Johannes Buchmann, Wouter Castryck, Orr Dunkelman, Tim Guneysu, Shay Gueron, Andreas Hulsing, Tanja Lange, Mohamed Saied Emam Mohamed, Christian Rechberger, Peter Schwabe, Nicolas Sendrier, Frederik Vercauteren, and Bo-Yin Yang. *Post-Quantum Cryptography for Long-Term Security*, 7 Sep. 2015.
[5] Daniel J. Bernstein, Chitchanok Chuengsatiansup, Tanja Lange, and Christine van Vredendaal. *NTRU Prime: reducing attack surface at low cost*, 2018.
[6] Jeffrey Hoffstein, Jill Pipher, and Joseph H. Silverman. *NTRU: A public key cryptosystem*. 1999.
[7] Ruiqing Dong. *Efficient Multiplication Architectures for Truncated Polynomial Ring*. PhD thesis, 2016. https://scholar.uwindsor.ca/etd/5814.
[8] Eliane Jaulmes and Antoine Joux. A chosen-ciphertext attack against NTRU. In Mihir Bellare, editor, *Advances in Cryptology—CRYPTO 2000*, pages 20-35, Berlin, Heidelberg, 2000. Springer Berlin Heidelberg.
[9] Nick Howgrave-Graham, Joseph H. Silverman, Ari Singer, and William Whyte. *NAEP: Provable Security in the Presence of Decryption Failures*, 2003. wwhyte@ntru.com 12278 received 14 Aug. 2003.
[10] Eiichiro Fujisaki and Tatsuaki Okamoto. *Secure Integration of Asymmetric and Symmetric Encryption Schemes*, Journal of Cryptology, 26:80-101, 2013.
[11] Jeffrey Hoffstein and Joseph H. Silverman. Protecting ntru against chosen ciphertext and reaction attacks. 2000.
[12] Zhenfei Zhang. A short review of NTRU cryptosystem, 07 2017.
[13] Ali Atici, Lejla Batina, Junfeng Fan, Ingrid Verbauwhede, and S. B. O Yalgin. Low-cost Implementations of NTRU for pervasive security. pages 79-84, 08 2008.
[14] Jean-Frangois Biasse and Fang Song. Efficient quantum algorithms for computing class groups and solving the principal ideal problem in arbitrary degree number fields. In *Proceedings of the Twenty-Seventh Annual ACM-SIAM Symposium on Discrete Algorithms*, SODA '16, page 893-902, USA, 2016. Society for Industrial and Applied Mathematics.
[15] Ronald Cramer, Leo Ducas, and Benjamin Wesolowski. Short stickelberger class relations and application to Ideal-SVP. Cryptology ePrint Archive, Report 2016/885, 2016. https://eprint.jacr.org/2016/885.
[16] Philip Hirschhorn, Jeffrey Hoffstein, Nick Howgrave-Graham, and William Whyte. Choosing NTRUEncrypt parameters in light of combined lattice reduction and MITM approaches. volume 5536, pages 437-455, 06 2009.

The invention claimed is:

1. A method of securely communicating a message; the method comprising the steps of:
   selecting a ring R' of bi or multi variate multinomials;
   generating a private key which has a multinomial f;
   generating a public key which has a multinomial h;
   encrypting by representing said message as a multinomial m in R', selecting a random multinomial r, and computing an encrypted message; and
   decrypting said message using said public key,
   wherein each of said steps of generating a private key, generating a public key and computing an encrypted message includes performing one or more algebraic multiplications performed in canonical algebra over the ring R' using optical Fourier transform processing.

2. The method according to claim 1, further comprising the step of casting said message as a two-dimensional array.

3. The method according to claim 1, wherein the ring R' is chosen as the quotient of Z[X, Y] over the ideal generated by two uni-variate polynomials.

4. The method according to claim 1, wherein said steps comprise multiplications which are performed modulo two polynomials.

5. The method according to claim 2, further comprising utilizing an optical processing system to perform said optical Fourier transform of the two-dimensional array as a two-dimensional discrete Fourier transform.

6. The method according to claim 1, wherein the ring R' of multinomials is represented by the formula $Z[X, Y]/(X^{N_1}-1, Y^{N_2-1})$, where $(N_1, N_2) \in N^{*2}$, wherein $N_1$ and $N_2$ are prime numbers.

7. The method according to claim 1, further comprising the step of providing a said message m cast as a multinomial.

8. The method according to claim 7, further comprising representing the multinomial m as a discrete 2D array.

9. The method according to claim 1, further comprising the steps of providing an optical system suitable for performing both a said Fourier transform and an inverse Fourier transform and optically realising both said Fourier transform and said inverse Fourier transform.

10. The method according to claim 1, further comprising the steps of performing a multinomial multiplication and reducing coefficients of a product of multinomials.

11. The method according to claim 1, further comprising the step of reducing the amplitude of individual coefficients of the multinomials.

12. The method according to claim 1, further comprising the step of iteratively reducing coefficients of a product of multinomials by writing each factor as a sum of multinomials with smaller coefficients.

13. The method according to claim 1, further comprising the step of reducing coefficients by reducing degrees of the multinomials to be multiplied.

14. The method according to claim 1, further comprising the step of reducing the coefficients of a product of multinomials by writing each factor as a sum of multinomials with smaller degrees.

15. The method according to claim 1, further comprising the step of reducing the coefficients of a product of multinomials with security based on the reduction to a short vector problem using tensors.

16. A method of communicating information between users of a communications system, the method comprising the steps of:

generating a ring R and ideals P and Q in R;

generating one public key element h as a function of one private key element f in R and the ideal Q of the first user; and transmitting from a first user to a second user a description of the ring R, the ideal Q, the ideal P, and the element h in R;

generating an element e in R as a function of the ideals P and Q, the public key element h, a private message element m in R, and one private random element r of the second user; and transmitting the element e from the second user to the first user, such that the first user can determine the message element m by computing a result A in R of evaluating a function F of e, f, computing a result B of evaluating a function G of a, f, and computing a result c in P of evaluating a function H of b, f, said operations being performed using Fourier transform processing implemented optically.

17. The method according to claim 14, wherein said steps are performed after reducing the magnitude of the multinomials.

* * * * *